(12) United States Patent
Müller et al.

(10) Patent No.: US 10,655,601 B2
(45) Date of Patent: May 19, 2020

(54) METHOD FOR THE INDIVIDUAL PITCH CONTROL OF ROTOR BLADES OF A WIND TURBINE, AND WIND TURBINES

(71) Applicant: fos4X GmbH, München (DE)

(72) Inventors: Mathias Müller, München (DE); Matthias Schubert, Rendsburg (DE)

(73) Assignee: fos4X GmbH, München (DE)

( * ) Notice: Subject to any disclaimer, the term of this patent is extended or adjusted under 35 U.S.C. 154(b) by 328 days.

(21) Appl. No.: 15/532,421

(22) PCT Filed: Dec. 1, 2015

(86) PCT No.: PCT/EP2015/078237
§ 371 (c)(1),
(2) Date: Jun. 1, 2017

(87) PCT Pub. No.: WO2016/087455
PCT Pub. Date: Jun. 9, 2016

(65) Prior Publication Data
US 2017/0268486 A1    Sep. 21, 2017

(30) Foreign Application Priority Data

Dec. 4, 2014  (DE) .................. 10 2014 117 918

(51) Int. Cl.
*F03D 7/02* (2006.01)
*F03D 17/00* (2016.01)
*F03D 7/04* (2006.01)

(52) U.S. Cl.
CPC ........... *F03D 7/0224* (2013.01); *F03D 7/042* (2013.01); *F03D 17/00* (2016.05);
(Continued)

(58) Field of Classification Search
CPC .......... F03D 7/04; F03D 7/042; F03D 7/0224; F03D 17/00; F05B 2270/807; F05B 2260/80; Y02E 10/721; Y02E 10/723
See application file for complete search history.

(56) References Cited

U.S. PATENT DOCUMENTS 4,800,267 A     1/1989 Freal et al.
8,123,478 B2 *  2/2012 Ahmann ............... F03D 7/0224
                                                416/1
(Continued)

FOREIGN PATENT DOCUMENTS

DE   102004029196 A1    1/2006
DE   102010023887 A1   12/2011
(Continued)

OTHER PUBLICATIONS

International Preliminary Report on Patentability dated Jun. 15, 2017 for PCT Application No. PCT/EP2015/078237.
(Continued)

*Primary Examiner* — Peter J Bertheaud
(74) *Attorney, Agent, or Firm* — Moser Taboada

(57) ABSTRACT

A method for the individual pitch control of the rotor blades of a wind turbine is provided herein. In some embodiments, the method includes measuring an acceleration by an acceleration sensor in a rotor blade of the wind turbine; high-pass filtering of a signal of the acceleration sensor in order to determine a time-variant variable; and setting the pitch of the first rotor blade of the wind turbine using the time-variant variable, the pitch setting being part of an individual pitch control.

21 Claims, 14 Drawing Sheets

(52) U.S. Cl.
CPC ..... *F05B 2260/80* (2013.01); *F05B 2270/334* (2013.01); *F05B 2270/704* (2013.01); *F05B 2270/804* (2013.01); *F05B 2270/807* (2013.01); *Y02E 10/721* (2013.01); *Y02E 10/723* (2013.01)

(56) References Cited

U.S. PATENT DOCUMENTS

| | | | |
|---|---|---|---|
| 9,316,571 B2* | 4/2016 | Muller | G01P 15/093 |
| 10,024,303 B2* | 7/2018 | Wakasa | F03D 7/0252 |
| 10,422,321 B2* | 9/2019 | Muller | G01P 15/093 |
| 10,480,486 B2* | 11/2019 | Brodsgaard | F03D 7/0224 |
| 2009/0169378 A1 | 7/2009 | Menke | |
| 2014/0003939 A1 | 1/2014 | Adams et al. | |

FOREIGN PATENT DOCUMENTS

| | | |
|---|---|---|
| DE | 102010032120 A1 | 1/2012 |
| DE | 102012108776 A1 | 3/2014 |
| WO | WO-2010099928 A2 | 9/2010 |
| WO | WO-2012125842 A2 | 9/2012 |

OTHER PUBLICATIONS

Wenjun Zhang et al., "Design and Implementation of Anti-aliasing Filtering Technology in Acceleration Sensor", Apr. 30, 2014.
German Patent Examination Report dated Aug. 18, 2015 for Patent Application No. 102014117918.8.
International Search Report and Written Opinion dated Feb. 26, 2016 for PCT Application No. PCT/EP2015/078237.

* cited by examiner

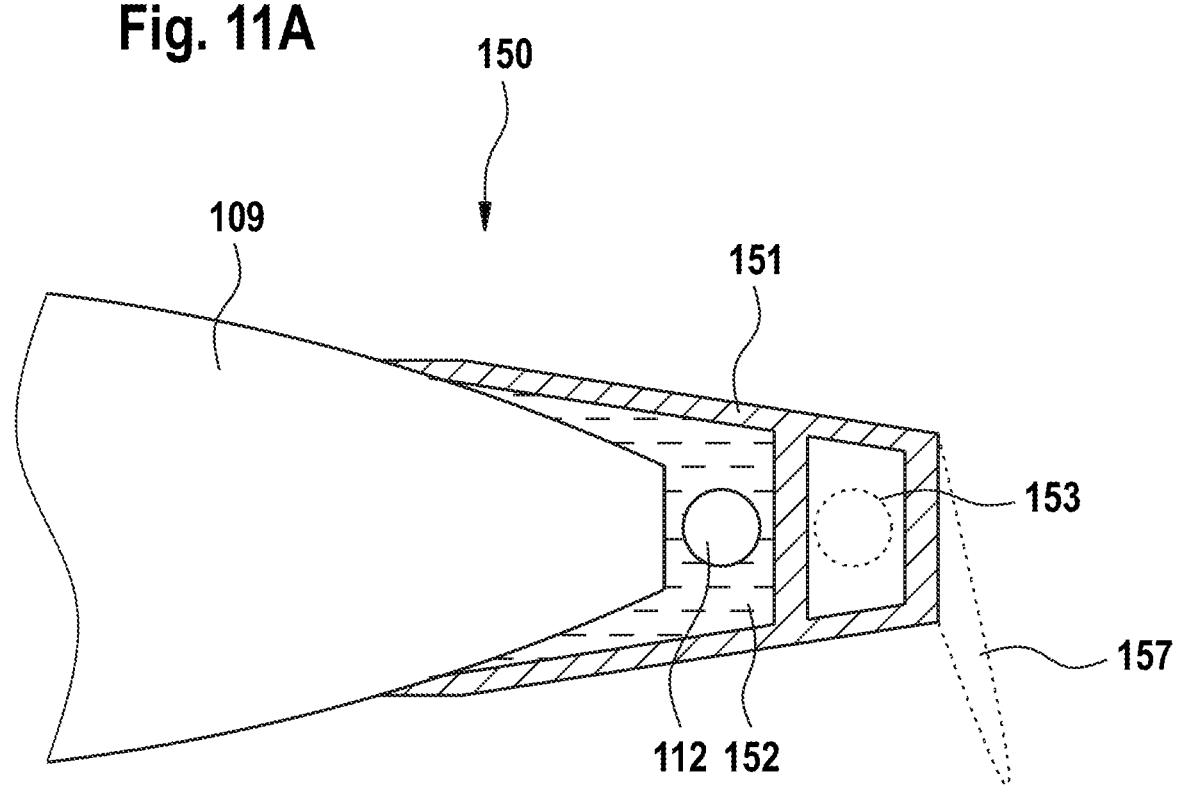

METHOD FOR THE INDIVIDUAL PITCH CONTROL OF ROTOR BLADES OF A WIND TURBINE, AND WIND TURBINES

TECHNICAL FIELD

Embodiments of the present invention generally relate to controlling and/or regulating and monitoring, respectively, the operation of wind turbines and the components used for this purpose such as acceleration sensors and/or the corresponding components of a wind turbine. Embodiments relate in particular to a method for the individual pitch control of rotor blades of a wind turbine, a rotor of a wind turbine, and a wind turbine.

PRIOR ART

Wind energy plants are subject to a complex control which may be required, for instance, by changing operating conditions. Due to the conditions associated with the operation of a wind turbine, for example, temperature variations, atmospheric influences and weather conditions, yet also in particular strongly changing wind conditions, as well as the multitude of safety measures prescribed by law, the monitoring and the sensors required for the monitoring are subject to a multitude of constraints.

As an example, it is nowadays desirable for the improvement of wind turbines to provide for an individual pitch control in order to ensure an optimized operation according to the external conditions. An improved identification of the forces acting upon the wind turbine, and of the operating state, respectively, is desirable for this purpose.

In monitoring operating states of wind turbines and in controlling and regulating of wind turbines, respectively, a plurality of sensors is used. For instance, strain measurements for measuring the bending of a rotor blade, acceleration measurements for measuring an acceleration of a rotor blade or other variables can be measured. One group of sensors that appears to be promising for future applications, is fiber-optic sensors. It is therefore desirable to further improve measurements for monitoring a wind turbine by means of fiber-optic sensors.

In general, it is therefore desirable for improvements in the controlling and monitoring, in the sensors for a rotor blade of a wind turbine, in rotor blades for wind turbines and wind turbines themselves to be enabled.

SUMMARY

According to one embodiment, a method for the individual pitch control of rotor blades of a wind turbine is provided. The method comprises measuring an acceleration by means of an acceleration sensor in a rotor blade of a wind turbine; high-pass filtering a signal of the acceleration sensor in order to determine a time-variable parameter; and setting the pitch of the first rotor blade of the wind turbine using the time-variable parameter, said pitch setting being performed in the course of an individual pitch control.

According to one embodiment, a wind turbine is provided. The wind turbine comprises a first rotor blade that is mounted to a hub; a first drive unit for rotating the first rotor blade for a pitch control of the first rotor blade; at least one second rotor blade that is mounted to the hub; at least one second drive unit for rotating the second rotor blade for a pitch control of the second rotor blade, wherein the second drive unit is controllable independently of the first drive unit; a control unit for controlling at least the first drive unit; a first acceleration sensor in the first rotor blade of the wind turbine; means for high-pass filtering a signal of the first acceleration sensor for determining a time-variable parameter; and a control unit, with the control unit being configured to control a pitch setting of the first rotor blade using the time-variable parameter.

BRIEF DESCRIPTION OF THE DRAWINGS

Exemplary embodiments are illustrated in the drawings and explained in more detail in the following description. Shown are in the drawings:

FIG. 11A shows a profile for a rotor blade according to embodiments of the present invention;

In the drawings, identical reference numerals refer to identical or functionally equivalent components or steps.

WAYS FOR CARRYING OUT THE INVENTION

Figure 1:
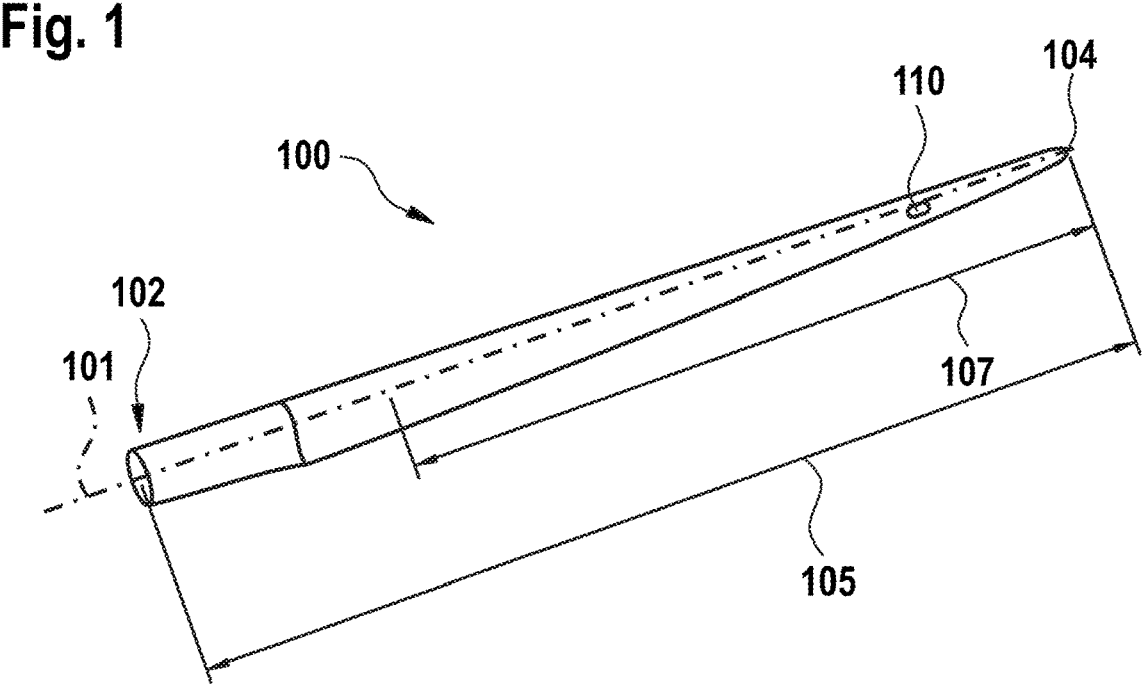
FIG. 1 schematically shows a rotor blade of a wind turbine comprising an acceleration sensor according to embodiments described herein.

Hereinafter, detailed reference is made to various embodiments of the invention, with one or more examples being illustrated in the drawings.

FIG. 1 shows a rotor blade 100 of a wind turbine. The rotor blade 100 has an axis 101 along its longitudinal extension. The rotor blade length 105 ranges from the blade flange 102 to the blade tip 104. According to embodiments described herein, an acceleration sensor 110 is located in an axial or radial area, i.e. in an area along the axis 101, with the acceleration sensor being provided at a radial position in the range of the outer 70% of the radius of a rotor blade of the wind turbine.

In practice so far, sensors have been attached close to the blade flange 102. Typically, sensors were in practice hitherto attached within the inner 20% of the radius of a rotor blade. This positioning hitherto has been a frequently required prerequisite since a stroke of lightning is a serious danger for wind energy plants or wind turbines. On the one hand, lightning might directly strike into electronic components and/or cables or signal cables for electronic components. On the other, even when a lightning stroke is discharged via a lightning rod, i.e. in a controlled discharge to an earth potential, a damage might occur in cables or signal cables due to the currents generated by induction. When lightning strikes, this might lead to components of a wind turbine getting destroyed. On the other hand, lightning strokes may result in higher material fatigue. This might considerably increase maintenance costs, for instance. For example, one to four lightning strokes per year into a rotor blade can be expected.

In practice, this positioning of sensors close to the blade flange is a constraint or existing acceptance confronted by embodiments of the present invention. Sensors, in particular acceleration sensors, when in a radial positioning, provided contrary to common practice in the range of the outer 70% of the rotor blade radius, can enable improved methods for measuring operating states of a wind turbine.

According to typical embodiments, positioning an acceleration sensor along the radius of a rotor blade may be provided as follows. In case of rotor blades that can be walked in to about 50% to 60% of the radius (here, the blade flange corresponds to approximately 0% of the radius), at least one acceleration sensor may be provided at a radial position in the range of the outer 70% of the rotor blade radius. In case of rotor blades comprising a considerably smaller accessible area, the benefit of an installation at an accessible position may be abandoned alternatively. In such a case, an installation of an acceleration sensor close to the blade tip can be provided for instance in a range of 30% to 95% of the radius (0% corresponds to the flange at the blade root).

Figure 2:
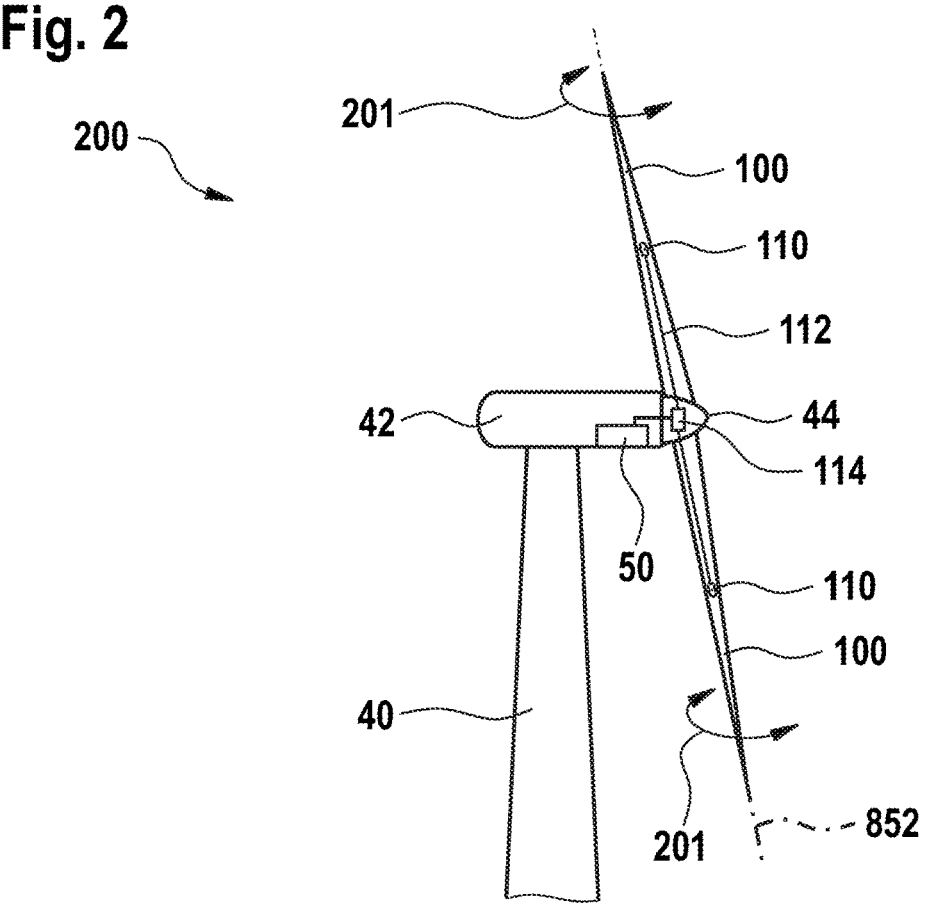
FIG. 2 schematically shows a part of a wind turbine comprising rotor blades and acceleration sensors according to embodiments described herein.

FIG. 2 shows a wind turbine 200. The wind turbine 200 comprises a tower 40 and a nacelle 42. The rotor is attached to the nacelle 42. The rotor comprises a hub 44 to which the rotor blades 100 are attached. According to typical embodiments, the rotor has at least 2 rotor blades, in particular 3 rotor blades. When the wind energy plant or wind turbine is in operation, the rotor, i.e. the hub together with the rotor blades, rotates about an axis. In doing so, a generator is driven to produce electricity. As illustrated in FIG. 2, at least one acceleration sensor 110 is provided in a rotor blade 100. The acceleration sensor is connected to an evaluating unit 114 by means of a signal line. The evaluating unit 114 delivers a signal to a control unit and/or regulating unit 50 of the wind turbine 200.

According to some embodiments which may be combined with other embodiments, the acceleration sensor 110 is a fiber-optic acceleration sensor, in particular a fiber-optic acceleration sensor. For fiber-optic acceleration sensors, an optical signal is transmitted to the evaluating unit 114 by means of a light conductor 112, e.g. an optical fiber. In a fiber-optic acceleration sensor, the sensor element itself may be provided outside an optical fiber. An example is described in detail with reference to FIGS. 9A and 9B. As an alternative to this, the actual sensor element may be provided in a fiber-optic acceleration sensor within an optical fiber, for example in the form of a fiber Bragg grating. This is described in detail with reference to FIGS. 3 and 4.

According to some embodiments described herein which may be combined with other embodiments, fiber-optic acceleration sensors in which a signal is optically transmitted via a light conductor 112 enable a radial position so far in practice considered to be unfavorable since the transmission by means of a light conductor or an optical fiber entails a reduced risk of lightning damage. Consequently, an existing prejudice of installing sensors close to the blade flange is overcome in this case. This may in particular be enabled by using metal-free acceleration sensors or substantially metal-free acceleration sensors such as those described in more detail with reference to FIGS. 9A and 9B. Yet, fiber-optic acceleration sensors may also be provided in a manner to allow an installation in a radially outer area of a rotor blade without ignoring the risk of lightning damage.

Figure 3:
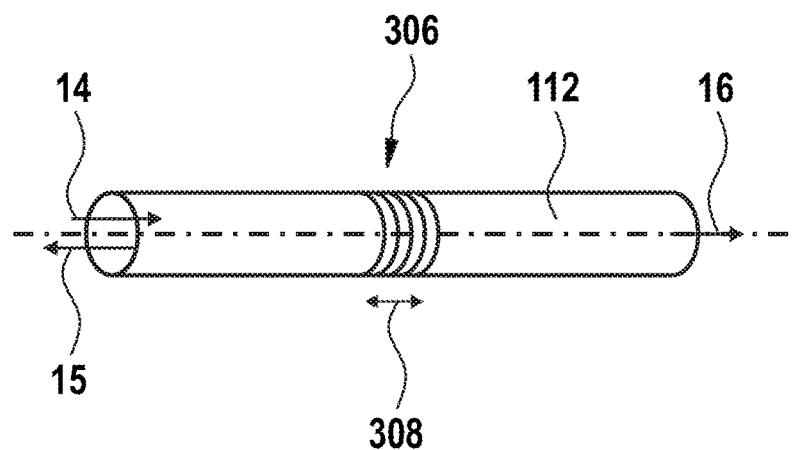
FIG. 3 schematically shows an optical fiber having a fiber Bragg grating for use in acceleration sensors according to embodiments described herein.

FIG. 3 shows a sensor integrated in light wave conductor or fiber-optic sensor 310 comprising a fiber Bragg grating 306. Although only one single fiber Bragg grating 306 is shown in FIG. 3, it is to be understood that the present invention is not limited to data acquisition from a single fiber Bragg grating 306 but that a plurality of fiber Bragg gratings 306 may be arranged along a light conductor 112, a transmission fiber, a sensor fiber or an optical fiber.

FIG. 3 thus only shows a portion of an optical wave conductor configured as a sensor fiber, optical fiber or light conductor 112, with this sensor fiber being sensitive to fiber elongation (see arrow 308). It should be pointed out here that the term "optical" or "light" is intended to refer to a wavelength range in the electromagnetic spectrum which may extend from the ultraviolet spectral range via the visible spectral range up to the infrared spectral range. An average wavelength of the fiber Bragg grating 306, i.e. a so-called Bragg wavelength λB, is obtained by the following equation:

$$\lambda B = 2 \cdot nk \cdot \Lambda$$

In this case, nk is the effective refractive index of the optical fiber's core basic mode, and Λ is the spatial grating period (modulation period) of the fiber Bragg grating 306.

A spectral width given by a full width at half maximum of the reflection response depends on the fiber Bragg grating's 306 elongation along the sensor fiber. Due to the effect of the fiber Bragg grating 306, the light propagation within the sensor fiber or light conductor 112 is thus dependent, for example, on forces, moments and mechanical tensions, as well as temperatures acting upon the sensor fiber, i.e. the optical fiber and in particular the fiber Bragg grating 306 within the sensor fiber.

As shown in FIG. 3, electromagnetic radiation 14 or primary light enters the optical fiber or the light conductor 112 from the left, with a part of the electromagnetic radiation 14 exiting as a transmitted light 16 at a changed wavelength progression as compared to the electromagnetic radiation 14. Furthermore, it is also possible to receive reflected light 15 at the fiber's input end (i.e. the end where the electromagnetic radiation 14 is fed in), with the reflected light 15 likewise exhibiting a modified wavelength distribution. The optical signal used for detection and evaluation may be provided according to embodiments described herein by the reflected light, by the transmitted light, as well as a combination of both of them.

In a case where the electromagnetic radiation 14 or the primary light is fed in over a wide spectral range, a transmission minimum arises in the transmitted light 16 at the place of the Bragg wavelength. In the reflected light, a reflection maximum arises at that place. The detecting and evaluating of intensities of the transmission minimum or reflection maximum or of intensities in corresponding wavelength ranges generate a signal which can be evaluated with respect to the optical fiber's or light conductor's 112 change of length and thus is indicative of forces or accelerations.

Figure 4:
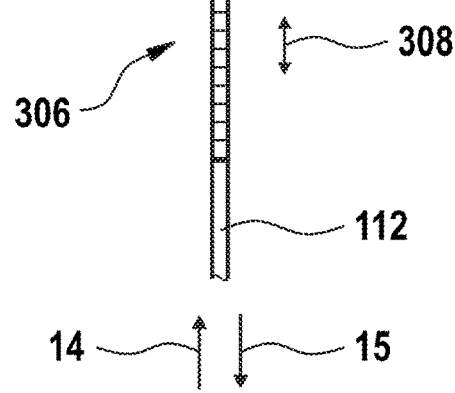
FIG. 4 schematically shows a configuration of an acceleration sensor according to embodiments described herein or to be used in embodiments described herein.

FIG. 4 shows a device 110 for detecting acceleration. The device includes a mass 402 attached to a lever arm 406. The lever arm 406 has a fixed point 422 so that a movement of the lever arm and the mass is enabled which is shown by arrow 423. Moreover, an optical fiber or light conductor 112 with a fiber Bragg grating 306 is attached to the lever arm 406. The sensor fiber is in this case attached to the lever arm 406 by means of a fastening element 412. According to typical embodiments, the fastening element may be an adhesive joint or a clamping device. The mass 402 is connected to the lever arm 406 at a first lever position, and the optical fiber is connected to the lever arm 406 at a second lever position. A movement of the mass or lever arm shown by arrow 423 results in a change in length of the optical fiber or light conductor 112 that is shown by arrow 308, or in an effect of force on the optical fiber. In this case, the fiber Bragg grating 306 produces a modified wavelength progression of the optical signal such as, for instance the reflected light 15 generated by reflection of the primary light or the electromagnetic radiation 14, which progression is dependent on the elongation or change in length.

In conventional acceleration sensors, the mass is typically restricted from moving in one or more spatial directions by a spring mechanism. In the simplest case, the mass can only move in one direction. A sensor fiber which elongates when the mass is accelerated is attached to the mass in this direction. In such an arrangement, the maximum elongation and thus the fiber's sensitivity are given by the weight of the mass and the rigidity of the fiber. In such a case, the sensitivity of such a sensor can be enhanced by merely increasing the mass. This may result in masses of up to several 100 g of weight for sensitive sensors. A further disadvantage of such an arrangement is that in this case the resonance frequency f of the fiber-mass system has a dependence f~root(k/m) which consequently decreases with an increasing mass. Here, k is the spring rigidity of the fiber-mass system. Since the minimum spring rigidity is restricted by the fiber's rigidity, only a restricted range may thus be configured.

By using a lever arm this restriction of the range to be configured can be cancelled or reduced. As can be recognized already in FIG. 4, a modification of the sensitivity of the device for detecting acceleration can be provided by changing the fastening position of the optical fiber along the lever arm 406, i.e. a change of the second lever position to which the optical fiber or the light conductor 112 is fastened. The sensitivity can thus be modified without changing the mass 402 for this purpose and thus influencing the resonance frequency.

Embodiments according to FIG. 4 thus allow for the correlation between the rigidity of the fiber, sensitivity and resonance frequency to be interrupted. The use of a mechanical lever makes the ratio of deflection of the fiber and necessary force arbitrarily configurable. Furthermore, the use of a lever arm allows for an increased force on the fiber even at a small mass or a constant mass.

The movement represented by arrow 423 is a movement of the lever arm 406 or the mass 402 in the paper plane of FIG. 4. Typically, the fixed point 422 may be designed such that a movement merely occurs in one plane. According to further embodiments, however, a movement may also occur in two planes or even three planes. In such embodiments with several planes of movement, further optical fibers each comprising a fiber Bragg grating 306 may be connected to the lever arm 406 so that a detection of acceleration may be performed in several spatial directions. According to typical embodiments, a device for multi dimensionally detecting acceleration, however, is implemented as described with reference to FIG. 8B.

Figure 5:
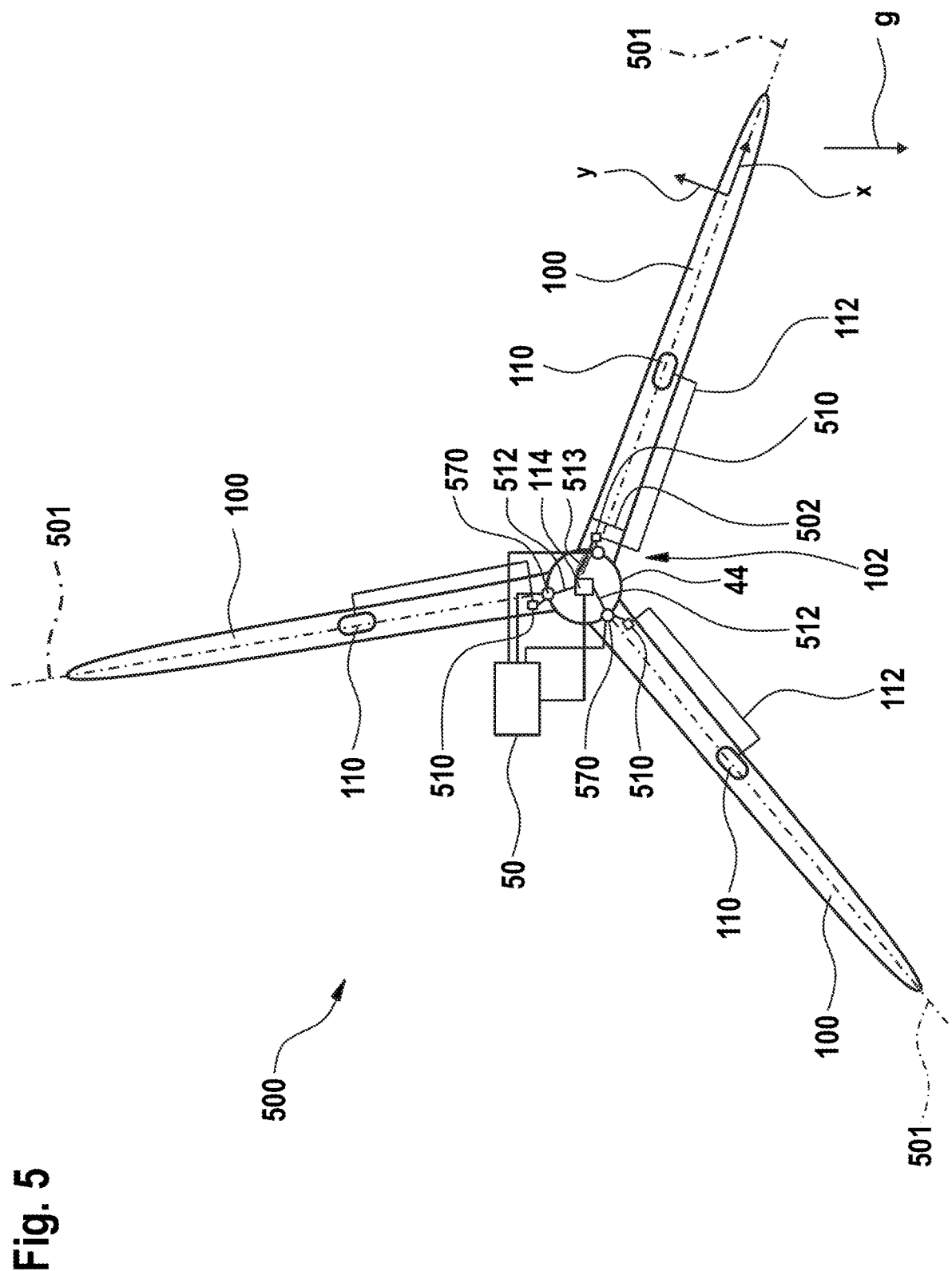
FIG. 5 schematically shows a rotor of a wind turbine comprising rotor blades and acceleration sensors according to embodiments described herein or to be used in embodiments described herein.

FIG. 5 shows a rotor 500 of a wind turbine. The rotor 500 has a hub 44 and rotor blades 100 attached thereto. An acceleration sensor 110 is provided in at least one of the rotor blades 100. The acceleration sensor's 110 signal is guided to a distributor 510 via a light conductor 112. By way of example, the distributor 510 may be a field distributor where a plurality of signals from different sensors is provided.

According to some embodiments which may be combined with other embodiments the distributor or field distributor may be attached to the blade bulkhead of the rotor blade. The distributor may be configured for plugging and unplugging a signal cable of a sensor. Furthermore, a sensor cable may be provided for plugging and unplugging from the field distributor to the measuring device or evaluating unit. According to some embodiments which may be combined with other embodiments the distributor 510 is provided on the blade bulkhead or in the blade root.

The area of the blade root is illustrated by the separating line 502. Typically, the blade root extends from a blade flange 102, by means of which the rotor blade 100 is fastened to the hub, in a radial manner, i.e. along the longitudinal extension of the rotor blade over a length of 1 m to 3 m.

As represented in FIG. 5, a light conductor 512 or an optical fiber may be guided from the distributor 510 to the evaluating unit 114 according to some embodiments. The light conductor 512 maybe guided, for instance along a spring or a spiral 513, or by a spring or a spiral 513 or a corresponding mechanical element so that, upon the rotor blade 100 rotating about its longitudinal axis, i.e. when the rotor blade is pitch-controlled, the light conductor will not be damaged. Mechanically guiding the light conductor 512 along a spiral or by means of a spiral 513 allows torsion of the light conductor so that the light conductor will not be damaged during pitching of the rotor blade.

A majority of the embodiments described in the Figures shows an acceleration sensor in each case in one of the rotor blades. According to further embodiments which may be combined with other embodiments, measurement of the acceleration may be performed at several positions of a rotor blade, in particular at several radial positions in the range of the outer 70% of the rotor blade radius. To this end, several acceleration sensors may be provided at the respective radial positions. Measuring at several radial positions allows the measuring accuracy to be increased, on the one hand. According to still further embodiments which may be combined with other embodiments one acceleration sensor or more acceleration sensors may be combined with at least one further sensor. The at least one further sensor may be selected from one or more sensors from the group consisting of: a strain sensor, a temperature sensor, a pressure sensor, a noise level sensor and an inclinometer (for measuring the position of the rotor's rotation).

Furthermore, measuring the temperature at the rotor blade for evaluating the signals of the acceleration sensor(s) is advantageous since the blade characteristics such as the eigen frequency will be influenced by the temperature. Correlating the blade characteristics with the signals of the acceleration sensor(s) results in a more precise evaluation during the generating of warning signals or the measurements of the acceleration sensor(s). The measuring of the temperature such as for instance by means of a temperature sensor may be performed, for example, in an acceleration sensor or in a light guide or an optical fiber.

Figure 6:
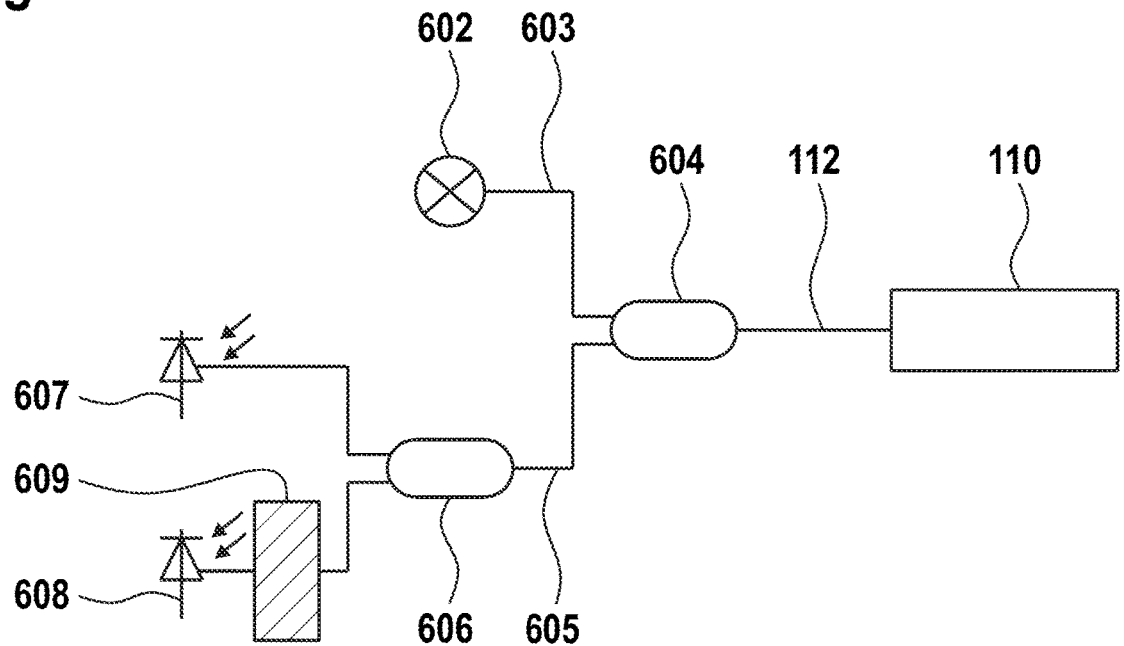
FIG. 6 schematically shows a measuring setup for a fiber-optic acceleration sensor according to embodiments described herein, and for methods for monitoring and/or controlling and/or regulating according to embodiments described herein, respectively.

FIG. 6 shows a typical measuring system for detecting acceleration by means of a device for detecting acceleration according to the embodiments described herein. The system includes one or more acceleration sensors 110. The system comprises a source 602 of electromagnetic radiation, for example a primary light source. The source serves the purpose of providing optical radiation by means of which at least one fiber-optic sensor element of an acceleration sensor can be irradiated. To this end, an optical transmission fiber or light conductor 603 is provided between the primary light source 602 and a first fiber coupler 604. The fiber coupler couples the primary light into the optical fiber or light conductor 112. The source 602 may be, for example, a wide band light source, a laser, an LED (light emitting diode), an SLD (super luminescence diode), an ASE light source (Amplified Spontaneous Emission light source), or a SOA (Semiconductor Optical Amplifier). Also, several sources of the same or different type (see above) may be used for embodiments described herein.

The fiber-optic sensor element such as a fiber Bragg grating (FBG) or an optical resonator, for example, is integrated into a sensor fiber or optically coupled to the sensor fiber. The light reflected by the fiber-optic sensor elements is in turn guided via the fiber coupler 604 which guides the light via the transmission fiber 605 to a beam splitter 606. The beam splitter 606 splits the reflected light for detection by means of a first detector 607 and a second detector 608. During this, the signal detected on the second detector 608 is first filtered by means of an optical edge filter 609.

The edge filter 606 allows detecting a displacement of the Bragg wavelength at the FBG or a change in wavelength by the optical resonator. In general, a measuring system as shown in FIG. 6 may be provided without the beam splitter 606 or the detector 607. The detector 607, however, enables normalizing the acceleration sensor's measuring signal with respect to other intensity fluctuations, such as, for example, fluctuations of the source's 602 intensity, fluctuations due to reflections at interfaces between individual light conductors, or other intensity fluctuations. This normalizing improves the measuring accuracy and reduces the dependence of measuring systems on the length of the light conductors provided between the evaluating unit and the fiber-optic sensor.

In particular, when several FBGs are used, additional optical filtering means (not represented) may be used to filter the optical signal or secondary light. An optical filtering means 609 or additional optical filtering means may comprise an optical filter selected from the group consisting of a thin film filter, a fiber Bragg grating, an LPG, an Arrayed-Waveguide-Grating (AWG), an Echelle grating, an array of gratings, a prism, an interferometer, and any combination thereof.

A further aspect in monitoring wind turbines which may be combined with other embodiments and aspects described herein, but is also provided independent of further embodiments, aspects and details, is an improved method for monitoring a wind turbine by means of a fiber-optic acceleration sensor. According to such an aspect or such an embodiment, a method for monitoring a wind turbine is provided. The method for monitoring a wind turbine comprises the measurement of an acceleration by means of a fiber-optic acceleration sensor, wherein the acceleration sensor is provided at a radial position in the range of the outer 70% of the radius of a rotor blade of the wind turbine, and the filtering of an acceleration signal of the fiber-optic acceleration sensor by means of an analog low-pass filter or an analog anti-aliasing filter.

Figure 7:
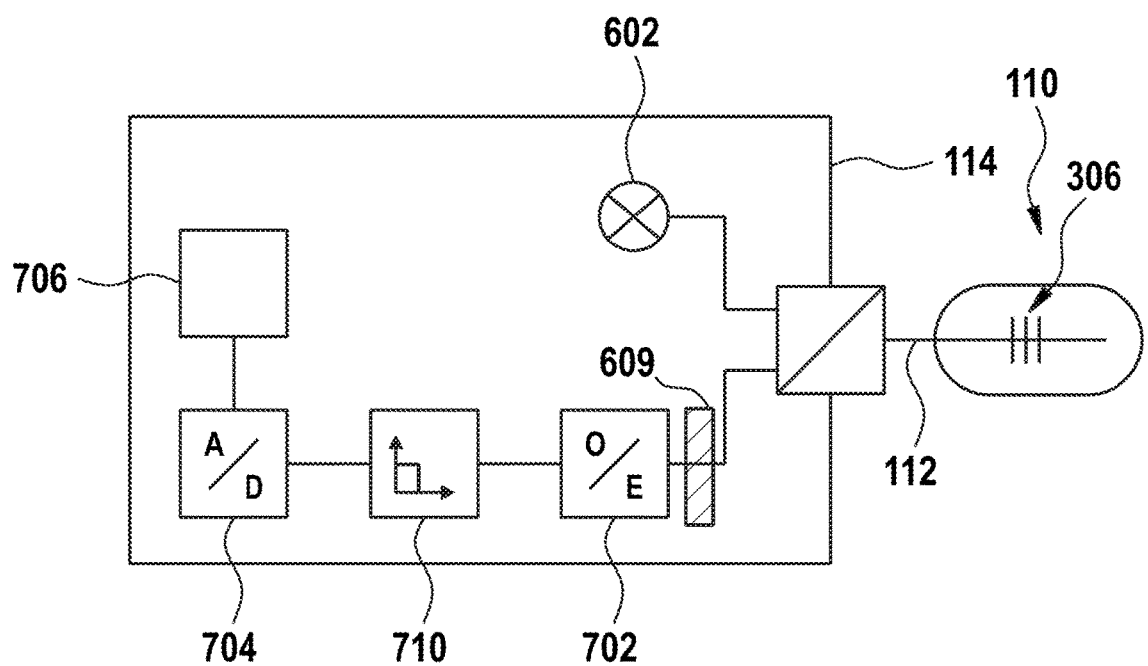
FIG. 7 schematically shows a measuring setup for a fiber-optic acceleration sensor according to embodiments described herein, and for methods for monitoring and/or controlling and/or regulating according to embodiments described herein, respectively.

FIG. 7 shows an evaluating unit 114, wherein a signal from a fiber Bragg grating 306 is guided to the evaluating unit via a light conductor. In FIG. 7, a light source 602 is further represented which can be optionally provided in the evaluating unit. The light source 602 may yet be provided independent of or external to the evaluating unit 114. The fiber-optic acceleration sensor's 110 optical signal is converted into an electrical signal by means of a detector. The conversion from an optical signal into an electrical signal is represented in FIG. 7 by symbol 702. The electrical signal is filtered by an analog anti-aliasing filter 710. Following the analog filtering by an analog anti-aliasing filter or low-pass filter the signal is digitized by an analog-to-digital converter 704.

According to some embodiments which may be combined with other embodiments, the anti-aliasing filter may have a cutoff frequency of 1 kHz or less, in particular 500 Hz or less, further in particular of 100 Hz or less. According to embodiments described herein, such a filtering takes place prior to digitizing. Moreover, spectral decomposition of the signals is not performed for the embodiments described herein, wherein an optical digitization is already performed by means of a spectrometer and multi-channel detector.

According to embodiments described herein, analog low-pass filtering is performed prior to digitizing a signal of a fiber-optic acceleration sensor. According to embodiments described herein which may be combined with other embodiments, the low-pass filter may also be referred to as an analog anti-aliasing filter. In this case, the Nyquist frequency is taken into consideration in the scope of a sampling theorem, and a low-pass filtering with signal portions smaller than the Nyquist frequency is provided by means of the analog low-pass filter or analog anti-aliasing filter.

The herein described embodiments comprising a fiber-optic acceleration sensor and an analog low-pass filtering allow better measuring of acceleration for monitoring a wind turbine to be provided.

FIG. 7 further shows a digital evaluating unit 706 which may include, for example, a CPU, memories and other elements for digital data processing. The aspect of the improved measuring by means of fiber-optic acceleration sensors on wind turbines by using an analog anti-aliasing filter may be combined with other embodiments, in particular with respect to positioning the acceleration sensors, using the signals for the pitch control; the attaching of acceleration sensors or light conductors, fiber-optic acceleration sensors which are improved for use in wind turbines due to a reduced metal content.

According to further embodiments, the improved measuring by means of fiber-optic acceleration sensors with an analog low-pass filtering prior to digitization may further be designed in an advantageous manner so as to perform a digital evaluation in the digital evaluating unit 706 for Stochastic Subspace Identification (SSI). In this case, Eigenvalues of the rotor blade may be calculated which may include in particular the damping and the frequencies, i.e. the natural frequencies of a rotor blade.

According to embodiments described herein, a wind turbine that is standing still or freewheeling is a wind turbine with the rotor turning at no load. A wind turbine, for instance, may freely turn with rotor blades being inclined backwards without the generator being switched on. This state can be described by a rotation frequency of the rotor of 0.1 Hz or less, for example.

According to further embodiments, the measuring by a fiber-optic acceleration sensor may be combined with temperature measurement. The temperature influences the rotor blade characteristics. Thus, the temperature measurement may be referred to in recognizing ice formation and/or evaluating the Eigenvalues. The Eigenvalues typically have a functional dependence on the temperature, for example. A deviation or change in the Eigenvalues may thus be determined relative to the Eigenvalues to be expected at a predefined temperature. According to still further embodiments which may be combined with embodiments described herein, consideration of a parameter selected from the group consisting of: rotor position, temperature, pitch angle, yaw acceleration and rotational rate of the rotor, may be provided in evaluating.

As explained with respect to FIG. 7, a method for monitoring a wind turbine by means of a fiber-optic acceleration sensor may be improved by embodiments using an analog low-pass filter or an analog anti-aliasing filter. According to respective embodiments, a rotor of a wind turbine may be provided. The rotor includes at least one rotor blade. A fiber-optic acceleration sensor is provided at a radial position in the range of the outer 70% of the rotor blade radius. An analog low-pass filter or an analog anti-aliasing filter is configured to filter the acceleration signal of the fiber-optic acceleration sensor, in particular to filter an electrical signal in an analog manner that was generated from the fiber-optic acceleration signal. The rotor includes, for example, an evaluating unit 114 provided in a hub 44. The evaluating unit 114 may include a converter to convert the optical signal into an electrical signal. A photodiode, a photomultiplier (PM) or another opto-electronic detector may be used as the converter, for example. The evaluating unit further includes an anti-aliasing filter 710 coupled with the converter's or opto-electronical detector's output, for example. The evaluating unit may further include an analog-to-digital converter 704 which is coupled with the output of the anti-aliasing filter 710. The evaluating unit 114 may furthermore include a digital evaluating unit 706 which is arranged to evaluate the digitized signals. Further configurations of the rotor or the rotor blades may be provided according to the embodiments described herein with respect to the fiber-optic acceleration sensors, the positioning of fiber-optic acceleration sensors and/or the signal transmission by light conductors.

Figure 7A:
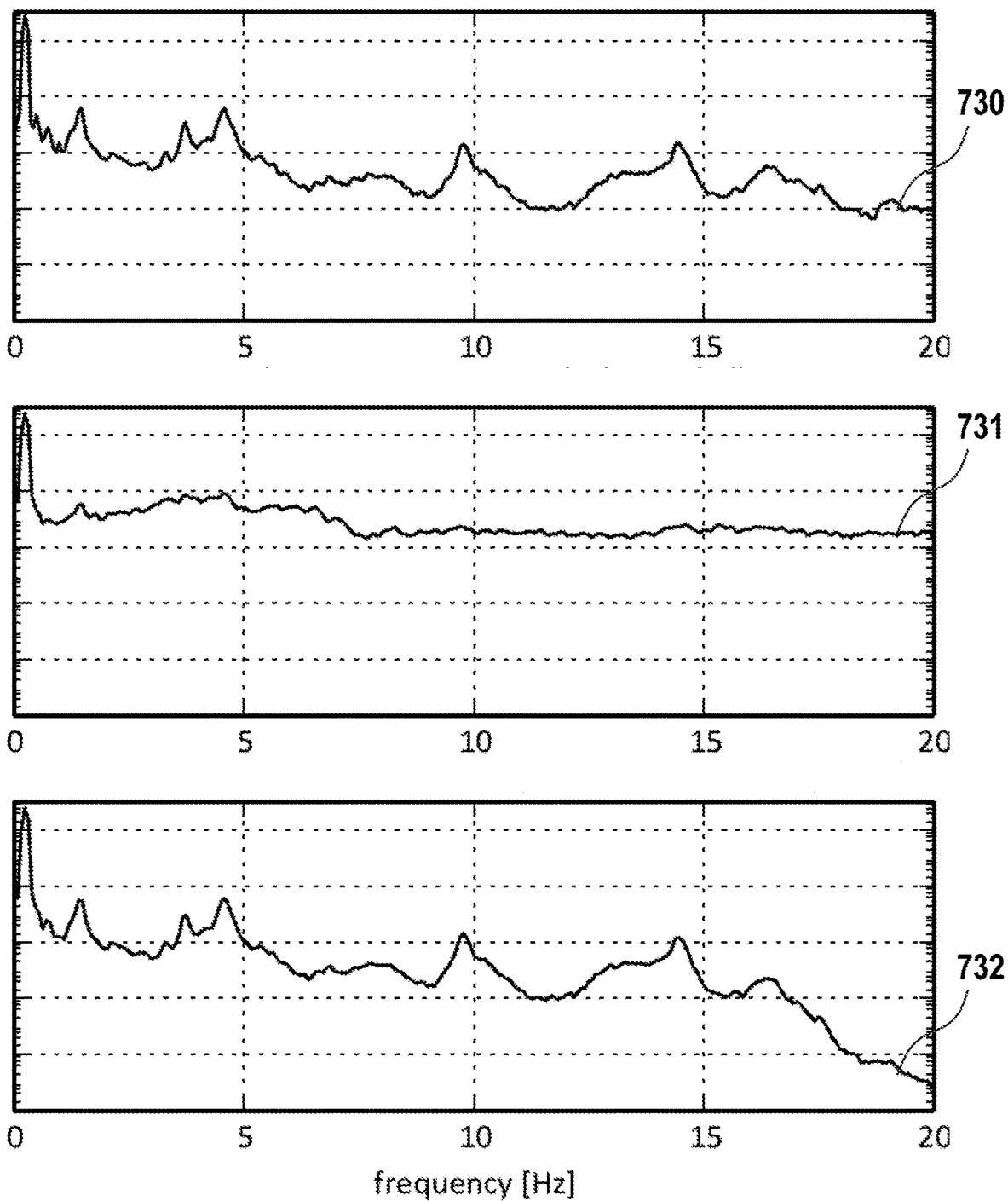
FIG. 7A shows the influence of the measurement by means of an anti-aliasing filter according to embodiments described herein.

FIG. 7A shows different acceleration signals for further explaining the embodiments described herein. In this case, the upper graph (730) in FIG. 7A shows a real acceleration in a rotor blade and a reference signal, respectively, that had been determined by a reference sensor for test purposes. The power spectral density (PSD) is plotted over the frequency to determine the Eigenvalues described herein, for example. The middle graph (731) shows the acceleration signal of a fiber-optic acceleration sensor, with the acceleration signal corresponding to the reference signal. The middle graph was generated without the sequence of opto-electronically converting the fiber-optic acceleration sensor's acceleration signal and filtering the opto-electronically converted acceleration signal by means of an analog anti-aliasing filter. The lower graph in FIG. 7A shows the acceleration signal of a fiber-optic acceleration sensor, with the acceleration signal corresponding to the reference signal. The lower graph was generated with the sequence of opto-electronically converting the fiber-optic acceleration sensor's acceleration signal and filtering the opto-electronically converted acceleration signal by means of an analog anti-aliasing filter. It can be clearly seen that for the lower graph (732) an improved recognition of Eigenvalues in particular in a frequency range from 0.3 Hz to 20 Hz exists as compared to the middle graph (731). According to embodiments described herein, improved measuring of optical acceleration signals may be achieved as a consequence. According to further embodiments which may be combined with embodiments described herein, the filtering of the opto-electronically converted acceleration signal by an analog anti-aliasing filter may have a cutoff frequency from 10 Hz to 40 Hz, in particular from 15 Hz to 25 Hz.

According to embodiments described herein, acceleration in a rotor blade may be optically measured. In this case, anti-aliasing filtering, in particular analog anti-aliasing filtering is performed. In contrast to other usual means of optical signal detection by means of spectrometers or the scanning by means of a scanning laser, acceleration in a rotor blade may be measured optically according to embodiments described herein. An anti-aliasing effect is prevented in contrast to smoothing the measured values, with a better control signal being merely generated when the measured values are smoothed. The anti-aliasing filtering in the embodiments described herein is performed in an analog manner, i.e. a conversion of the optical acceleration signal into an electrical measurement signal is used, for instance, prior to providing an analog anti-aliasing filtering. The analog electrical measurement signal is low-pass filtered in an analog way, with at least half the Nyquist frequency being used as a threshold value.

According to further embodiments described herein, the signal filtered by means of an analog anti-aliasing filter is evaluated by means of SSI (stochastic subspace identification). This allows frequency-dependent characteristics of rotor blades, for instance ageing, damage, etc. to be identified.

One or more Eigenvalues, for example, may be compensated here with at least one measured parameter from the group consisting of: a temperature at a rotor blade of the wind turbine, a wind velocity, an output of the wind turbine, a rotational rate of a rotor of the wind turbine, and a pitch angle of a rotor blade. Compensation may be performed, for example, using one of the following methods for calibration.

Acceleration in a rotor blade, for example, is measured by means of a fiber-optic acceleration sensor described herein. This may be performed in a first interval, for example a short interval of e.g. 5-30 minutes. Moreover, one or more of the parameters to be compensated may be measured. These parameters may be: a rotor blade temperature, a pitch angle, a wind velocity, an output of the wind turbine (e.g. the generated power or the power output to the mains), and/or a rotational rate of the rotor. The temperature of the rotor blade may in particular be measured as an influencing variable to the rotor blade's Eigenvalues. The rotor blade's Eigenvalues may be determined in the first interval from acceleration data by means of SSI. The Eigenvalues may be stored along with the associated parameter set of one or more of the parameters to be compensated. The measuring described above including the determining of the Eigenvalues may be repeated several times until a data set is obtained which represents a part or major part of the parameter space during operation of the respective wind turbine. This second interval may extend over several weeks, for example. After determining values in a part of the parameter space, the Eigenvalues' behavior may be determined over the parameter space, for instance by adapting to a suitable model (linear model, Taylor approximation, lookup table). The coefficients of the compensation model and the lookup table, respectively, may be stored in a computing unit of the wind turbine. Thus, calibrating of the Eigenvalues may be performed as a function of one or more parameters.

According to further embodiments, a measurement with compensated or calibrated parameters may be executed after the calibration. The Eigenvalues of a rotor blade may be determined by means of an acceleration measurement using a fiber-optic acceleration sensor, for example. These can be converted by means of the calibrating model, or the parameters determined during the acceleration measurement can be referred to for compensating the Eigenvalues. A deviation of the compensated Eigenvalues may be determined based on the compensated Eigenvalues. For example, the output of a warning signal may be provided by means of one or more threshold values. Alternatively, a plurality of threshold values may even be provided within the parameter space so that the output of a warning signal is performed using the Eigenvalues in the parameter space, i.e. without prior conversion of the Eigenvalues.

Figure 8A:
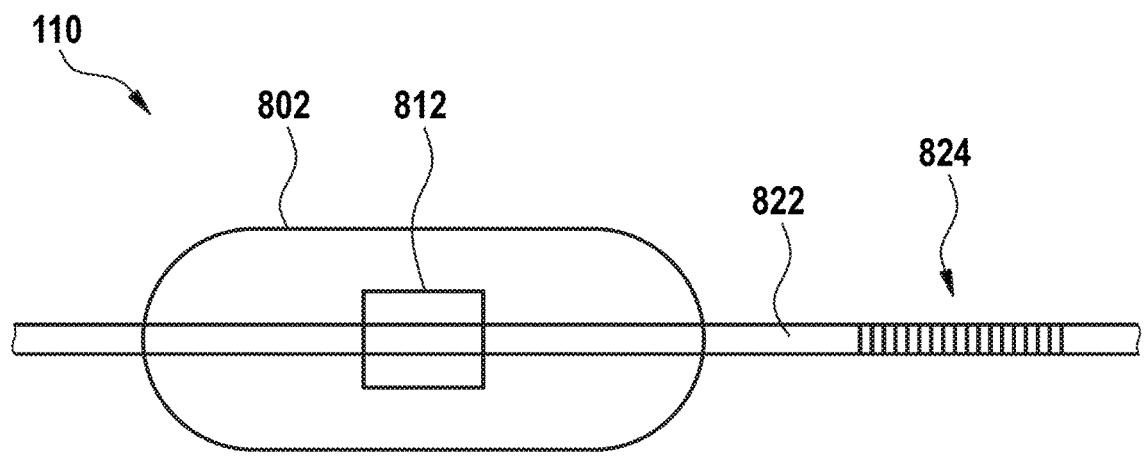
FIGS. 8A and 8B schematically show acceleration sensors for use in embodiments described herein.
Figure 8B:
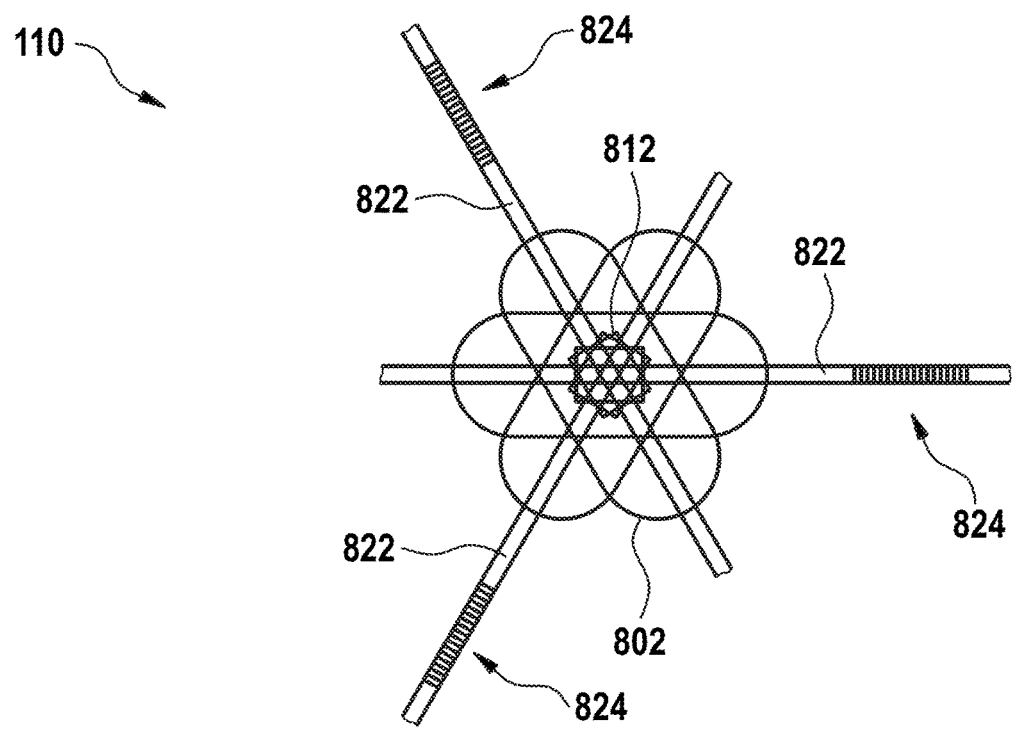

The acceleration sensor 110 which will be explained in greater detail in FIGS. 8A and 8B includes a test mass whose acceleration is measured in the sensor. According to typical embodiments, the strain sensors used and/or the acceleration sensors used may be fiber-optic sensors. In this case, the elongation or acceleration of the test mass is optically measured in a fiber by fiber Bragg gratings. Due to the use of these sensors, the measuring accuracy described above can be provided. Further, these sensors offer advantageous characteristics for being used in wind turbines.

The acceleration sensors 110 used in the arrangements and methods described herein will now be described with reference to FIGS. 8A and 8B. FIG. 8A shows an acceleration sensor 110, with a test mass 812 being attached to an optical fiber 822. A housing 802 is configured such that, when the mass 812 is accelerated an elongation, i.e. a relative change in length (lengthening or shortening) of the optical fiber 822 occurs. Due to the fiber's 822 elongation, the fiber Bragg grating 824 is modified. This leads to modified reflection or transmission of the fiber Bragg grating with respect to the reflected or transported wavelengths. This modification may be used as a degree of the fiber's elongation and thus indirectly as a degree of the acceleration of the test mass 812. An acceleration sensor 110 is shown in FIG. 8B. This arrangement combines 3 of the sensors shown in FIG. 8A, with the sensors' rotation being intended to represent a three-dimensional arrangement in the illustration, so that 3 acceleration values will be measured in a coordinate system such as a Cartesian coordinate system.

The use of the sensors 110 or rather their mutual arrangement, and the interaction of the evaluating unit 114 for monitoring a condition of a rotor blade will be explained in greater detail with reference to FIGS. 2 and 5. FIG. 2 shows a part of a wind turbine 200. A nacelle 42 is arranged on a tower 40. Rotor blades 100 are arranged on a rotor hub 44 so that the rotor (together with the rotor hub and the rotor blades) rotates in a plane illustrated by the line 852. Typically, this plane is inclined relative to the perpendicular line. FIG. 5 shows a front view of the rotor blades 100 and the rotor hub 44 in the direction of the axis of rotation, wherein coordinates x and y in the blade-fixed coordinate system, the gravitational force or gravitational acceleration g as well as the sensor 110 are represented.

During rotation of the rotor of the wind turbine, the acceleration sensor 110 measures the gravitational acceleration among other things. This gravitational acceleration is measured in the coordinate system according to FIG. 5 in the y-direction and in the x-direction. Due to the rotor's inclination which is illustrated in FIG. 2, the gravitational acceleration in the coordinate system in FIG. 5 will be superimposed to a certain extent on a signal in the z-direction as well. The measurement signal which is typically measured in the y direction plotted in FIG. 5, is superimposed on the signal of gravitation. By separating the measurement signal from the signal of gravitation, a cleaned signal is obtained.

The control and/or regulation units of modern wind turbines typically include a so-called pitch control, wherein the rotor blade is rotated about a longitudinal axis of the rotor blade. Consequently, the y-direction illustrated in FIG. 5 changes in a blade-fixed coordinate system during rotation of the rotor blade 100 about the rotor blade's longitudinal direction. When the acceleration measured by an acceleration sensor 110 is considered which includes the influence of the gravitational acceleration on a test mass, the different coordinate systems are required to be considered for an improved assessment of the signals. On the one hand, there exists a blade-fixed coordinate system. During rotation of the rotor blade about the rotor blade's longitudinal axis, the coordinate system as well as the sensor 110 are rotating. Furthermore, there exists a coordinate system which is fixed with respect to the rotor hub 44. In this case, this is a rotating coordinate system which can be used independent of a pitch-control. Furthermore, there exists a stationary coordinate system which is fixed with respect to the wind turbine 200 and thus fixed with respect to the gravitational force and gravitational acceleration, respectively.

According to typical embodiments, a transformation into the stationary coordinate system is made for correcting the signal/s of the acceleration sensor and/or the strain sensors, i.e. a signal in the x-direction, y-direction and z-direction in the blade-fixed coordinate system, wherein the rotor's rotation, the rotor blade's pitch angle as well as the rotor's inclination are taken into consideration. In the stationary coordinate system, the signal can be separated from the gravitational acceleration. Subsequently, a re-transformation into the coordinate system can be carried out which is fixed with respect to the rotor hub. In this coordinate system which is fixed with respect to the rotor hub, acceleration is typically determined substantially in parallel to the wind direction or substantially in parallel to the rotor's axis of rotation.

According to some embodiments described herein, an acceleration sensor is provided in the outer 70% of the radius of a rotor blade, in particular in a range of 60 to 90% of the rotor blade radius. In this case, an optical signal transmission may be performed for instance by using a fiber-optic acceleration sensor such as a fiber-optic acceleration sensor, for example. The optical signal transmission reduces the risk of a lightning damage. The optical signal transmission allows a limitation hitherto existing in practice to be overcome, namely to provide sensors as close as possible to the rotor flange.

The reduction of the risk of a lightning stroke or lightning damage may be further reduced by providing a metal-free or substantially metal-free acceleration sensor. According to an embodiment, a method for monitoring a wind turbine is provided. The method comprises the measurement of an acceleration by means of a fiber-optic acceleration sensor, wherein the acceleration sensor is provided at a radial position in the range of the outer 70% of the rotor blade radius, wherein the acceleration sensor is made of less than 10% by weight from metal or contains less than 20 g of metal.

According to a further embodiment, a rotor blade of a wind turbine is provided. The rotor blade comprises a fiber-optic acceleration sensor, wherein the fiber-optic acceleration sensor is provided at a radial position in the range of the outer 70% of the rotor blade radius, and wherein the acceleration sensor is made of less than 10% by weight from metal or contains less than 20 g of metal. By way of example, a light conductor may be guided from the fiber-optic acceleration sensor to a radial rotor blade position where the rotor blade can be walked in. According to still further embodiments which may be combined with other embodiments, the fiber-optic acceleration sensor may have a maximum expansion of 10 mm in a cross-section perpendicular to an extension of the light conductor.

According to embodiments described herein, acceleration sensors with sufficiently few metal or metal-free acceleration sensors may be provided. In addition to existing ideas of wireless signal transmission, i.e. signal transmission without electrical cables in a rotor blade, metal-free acceleration sensors may thus be provided providing a reduced risk of lightning stroke. A lightning safe design or a design having a reduced risk of lightning damage or lightning stroke allows the necessary high reliability and lifetime requirement of wind turbines to be met.

Small dimensions and/or masses of the sensor may be advantageous for an advantageous attachment in the blade tip, for example. For the fiber-optic measurement by means of fiber Bragg gratings, however, relatively large masses are necessary since the fiber is relatively rigid. In this case, a membrane sensor by means of a Fabry Perot interferometer may result in still further improvements.

Apart from fiber-optic acceleration sensors which can likewise be provided to be substantially metal-free, since the actual sensor system is provided by a fiber Bragg grating, a fiber-optic acceleration sensor may be provided as follows according to an embodiment. The fiber-optic acceleration sensor comprises a light conductor or an optical fiber having a light exit surface. The fiber-optic acceleration sensor further comprises a membrane and a mass connected to the membrane. In this case, the mass may either be provided in addition to the mass of the membrane, or the membrane may be configured with a suitable mass of sufficient size. The fiber-optic acceleration sensor comprises an optical resonator formed between the light exit surface and the membrane. The resonator may be a Fabry Perot resonator, for example. The fiber-optic acceleration sensor further comprises a mirror provided in the path of rays between the light exit surface and the membrane, wherein the mirror is formed at an angle of 30° to 60° relative to an optical axis of the light conductor or the optical fiber. The mirror may be formed at an angle of 45°, for example.

Figure 9A:
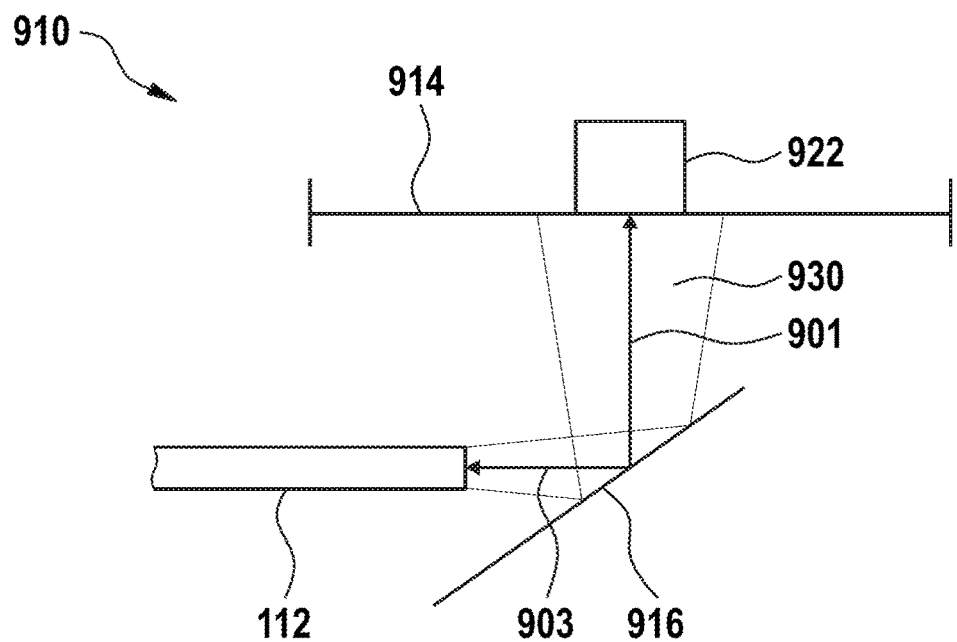
FIGS. 9A and 9B schematically show a fiber-optic acceleration sensor according to embodiments described herein or to be used in embodiments described herein.
Figure 9B:
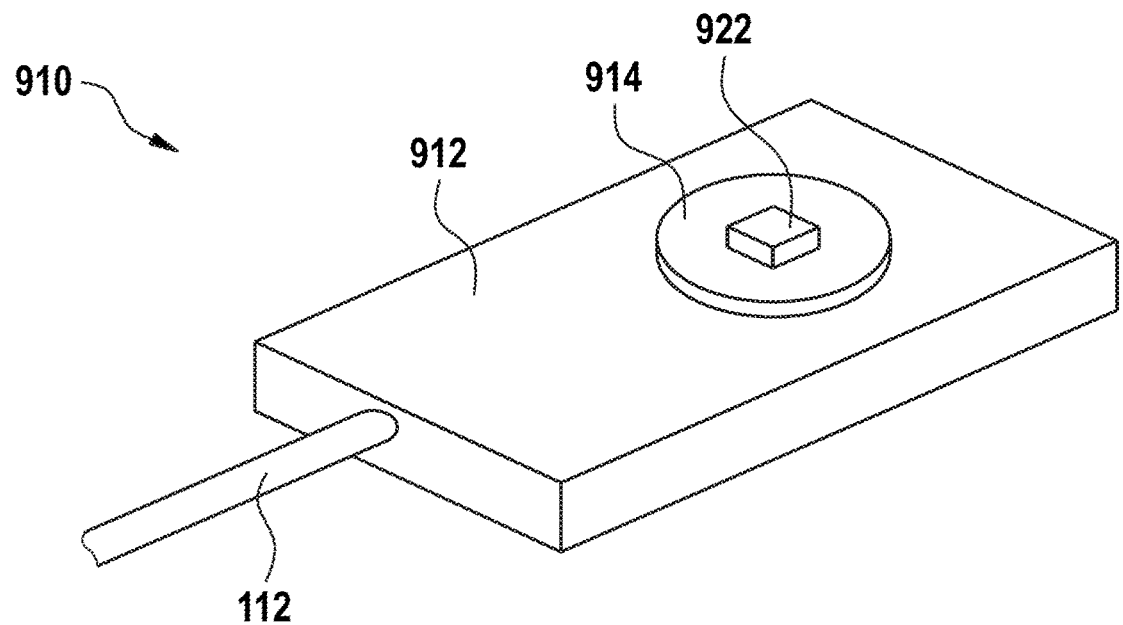

FIGS. 9A and 9B show a fiber-optic acceleration sensor 910. A primary optical signal is fed to the acceleration sensor 910 via a light conductor 112. The light conductor may be coupled to a substrate 912, for example. The substrate 912 may be made from a non-metallic material. A membrane 914 is formed on the substrate 912 or at the substrate 912. The primary optical signal exiting the light conductor 112 is directed toward the membrane 912 via a mirror 916. According to typical embodiments which may be combined with other embodiments, the mirror 916 may be provided as a surface shaped in the substrate. The substrate may be made, for instance, from a material reflecting in a predefined wavelength range, typically the wavelength range of the primary optical signal. The mirror may have an angle in the range of 30° to 60°, for instance an angle of 45°, relative to the light conductor's axis.

As indicated by the arrow 901, the primary optical signal is deflected by the mirror 916 and directed to the membrane. A reflection of the primary optical signal occurs at the membrane. As shown by the arrow 903, the reflected light is coupled back into the optical fiber or light conductor 112. Thus, an optical resonator 930 is formed between the light exit surface for the exit of the primary optical signal, and the membrane. Here, it should be taken into account that the light exit surface of the primary optical signal is in general equivalent to the light entry surface for the reflected secondary signal. The optical resonator may thus be formed as a Fabry Perot resonator. A mass 922 may be provided on the membrane 914 for a fiber-optic acceleration sensor according to embodiments described herein. Alternatively, the mass of the membrane itself may serve as the mass for the detection of acceleration. In case of acceleration, the membrane 914 will be deflected by the inertia of the mass 922. This results in an optically measurable signal in the optical resonator 930. According to embodiments described herein, the fiber-optic acceleration sensor is configured to measure acceleration having a directional component which is a directional component perpendicular to the axis of the fiber or light conductor 112. Due to the directional component being perpendicular to the axis of the light conductor 112, the fiber-optic acceleration sensor 912 may be employed in methods for monitoring rotor blades or may be installed in rotor blades of wind turbines or in wind turbines so as to enable monitoring.

According to embodiments described herein which may be combined with other embodiments, a fiber-optic acceleration sensor, i.e. for instance an extrinsic fiber-optic acceleration sensor comprising an optical sensor provided by means of the fiber or adjacent to the fiber, comprising an optical resonator, for example, or an intrinsic fiber-optic acceleration sensor comprising a sensor provided within the fiber, is provided at a radial position of the outer 70% of the rotor blade radius. In some cases, this corresponds to a radial area of the rotor blade where it is not possible to walk in the rotor blade in its finished state. According to further embodiments, the acceleration sensors' radial position described herein, may thus be represented even by a radial position where the rotor blade cannot be walked in in its finished state. In particular, the acceleration sensor may be provided in the outer 50% of the rotor blade radius or the outer 60 to 90% of the rotor blade radius. Due to the substantially metal-free configuration of the fiber-optic acceleration sensor, the risk of lightning stroke may be sufficiently reduced in order to use an acceleration sensor even in practice at such a radial position. Due to the acceleration sensor's radial position being shifted outwardly, a sensitivity of the acceleration sensor may be achieved allowing for numerous monitoring, condition monitoring and control options and/or regulation options.

According to exemplary embodiments, the components of the extrinsic fiber-optic acceleration sensor that are shown in FIGS. 9A and 9B may be made from the following materials. The light conductor 112, for example, may be a glass fiber, an optical fiber or an optical waveguide, wherein materials such as optical polymers, polymethylmethacrylate, polycarbonate, quartz glass, ethylene tetrafluoroethylene can be used which are doped, if necessary. The substrate 912 or the mirror 916 formed therein, may be made from silicon, for example. The membrane may be provided to be made from a plastic material or a semiconductor that is suitable to be formed as a thin membrane. The mass 922 may be provided to be of any non-metallic material, with materials having high density being particularly suitable. High density allows the dimensions of the mass to be reduced.

In order to provide a fiber-optic acceleration sensor as shown in FIGS. 9A and 9B, for example, in a particularly simple manner on a rotor blade, in particular in an outer radial range, it is advantageous for the fiber-optic acceleration sensor to have a small dimension in a cross-section perpendicular to the light conductor 112 in FIG. 9A or 9B. A maximum dimension in a cross-section perpendicular to the axis of the light conductor 112 may be 10 mm or less, for example. The configuration as shown with respect to FIGS. 9A and 9B allows such a dimensioning to be realized in a simple manner.

The fiber-optic acceleration sensor 910 described in FIGS. 9A and 9B may be formed into an independent further aspect through a further modification which can be applied in particular in methods for monitoring rotor blades of wind turbines and in rotor blades of wind turbines. When the mass 922 is reduced or omitted, the membrane 914 can be used both for measuring a static pressure and measuring a sound pressure level. For measuring a static pressure, the area of the optical resonator 930 is isolated from the ambient pressure so that a movement of the membrane occurs when the ambient pressure changes. For measuring a sound pressure level, the membrane is configured to perform a movement, in particular an oscillating movement at a corresponding sound pressure, which movement is transformed into an optical signal via the optical resonator. Here, for the use in rotor blades of wind turbines or the methods for monitoring wind turbines, it is particularly advantageous for the sound pressure to be measured in a direction perpendicular to the light conductor's 112 longitudinal extension.

According to embodiments described herein, different methods for monitoring and/or controlling (or regulating) wind turbines are provided. Furthermore, improved acceleration sensors, in particular intrinsic or extrinsic fiber-optic acceleration sensors are provided according to embodiments described herein. In this case, intrinsic fiber-optic acceleration sensors are sensors with a sensor unit such as a fiber Bragg grating, for example, that is provided within the fiber. Extrinsic fiber-optic acceleration sensors have an optical sensor provided by means of or on the fiber. Thus, extrinsic fiber-optic acceleration sensors as well can measure acceleration without electrical components by means of an optical fiber and an optical sensor, i.e. a non-electric sensor. In this case, acceleration sensors may be provided, for instance, at a radial position in the range of the outer 70% of the rotor blade radius, in particular in the range of the outer 50% of the rotor blade radius, such as for instance in the range of 60% to 95% of the radius, with 0% corresponding to the flange at the blade root. Further configurations for applying, positioning and guiding acceleration signals from the acceleration sensor to the blade root will be described hereinafter. These configurations for applying, positioning and guiding acceleration signals from the acceleration sensor to the blade root can be used with benefit for all of the embodiments described herein.

Figure 10:
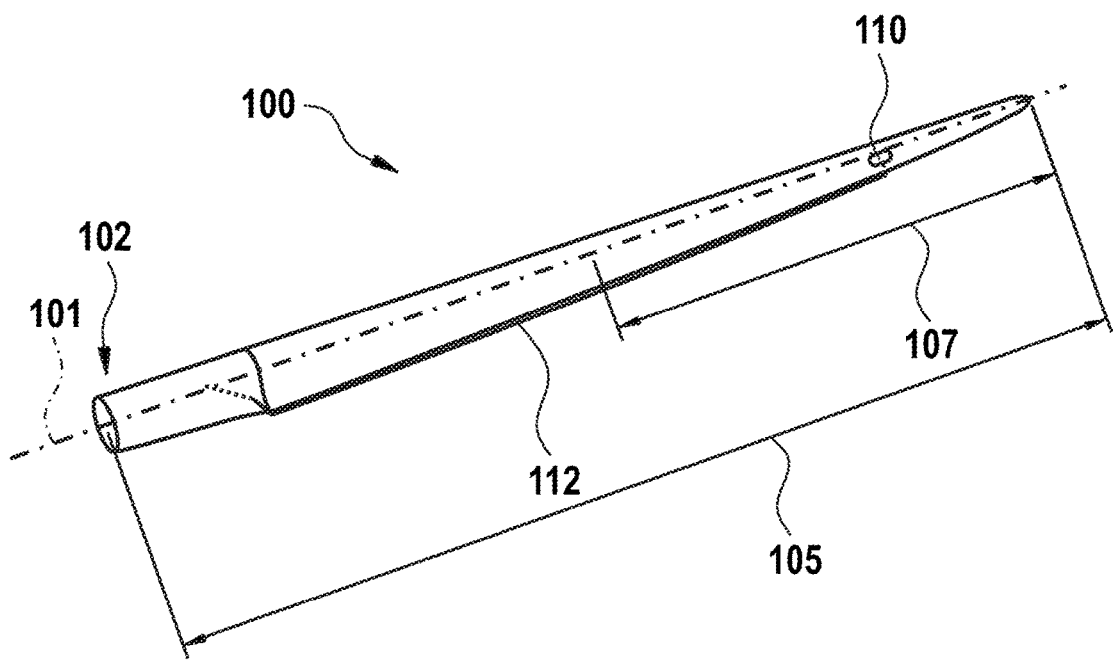
FIG. 10 schematically shows a rotor blade of a wind turbine comprising an acceleration sensor according to embodiments described herein.

FIG. 10 shows a rotor blade 100. The rotor blade extends along its length 105, which corresponds to the radius of the rotor blade, from the blade flange 102 to the blade tip. An acceleration sensor 110 is provided at a radial position in the area 107. The acceleration sensor may be a fiber-optic acceleration sensor 110, for example. A signal line from the acceleration sensor 110 to the blade root is guided along the rotor blade's rear edge. The signal line may be a light conductor 112, for example. According to embodiments described herein, the signal line may be provided within the rotor blade along the rear edge in a newly produced rotor blade, for example, or outside the rotor blade along the rear edge, for example in a profile attached to the rear edge.

Embodiments of the present invention allow acceleration sensors, in particular fiber-optic acceleration sensors, or rather fiber-optic acceleration sensors near the blade tip, i.e. in radial outer ranges described herein, where a rotor blade cannot be walked in, to be employed, to be retrofitted and/or to be able to take corresponding maintenance measures in repair cases. According to the disclosure under consideration here, a detailed technical teaching for executing and/or practicing a measurement of the acceleration in the radial outer ranges of a rotor blade can be derived. This technical teaching, on the one hand, refers to the mounting, guiding of light conductors, redundant use of components and/or retrofitting corresponding sensors, and, on the other—as an alternative or in addition—to measurement value logging by means of an analog anti-aliasing filter or an SSI evaluation of the acceleration sensors described herein. Thus, in addition to the purely theoretical use of such sensors in radially outer areas of a rotor blade, a technical teaching is provided enabling fiber-optic acceleration sensors to be practically used in a radial range of a rotor blade where the rotor blade cannot be walked in (for example, the outer 70%, in particular the outer 50%, furthermore in particular the outer 30% of the radius). Due to the anti-aliasing filters described herein, embodiments described herein thus allow good use of measurement signals. Moreover, as an alternative or in addition, the corresponding components may even be technically provided such that the improved regulation strategies or measurement strategies can be provided over a sufficiently long lifetime of more than 20 years, for example. Embodiments allow for repair and exchange options, for example, without which the use of acceleration sensors is not practicable.

Dotted lines in the area of the blade root illustrate that, according to embodiments described herein, in case of laying cables at the rear edge of the rotor blade, a piercing into the rotor blade interior is provided at a radial position where the rotor blade can be walked in. This may be in proximity to the blade root or at the blade root. However, this may also be in another radial area of the rotor blade where the rotor blade can be walked in.

In the production of new rotor blades, laying of the signal cable such as the light conductor 112, for example, may be performed inside the rotor blade, in particular in the rotor blade's rear case during the manufacturing process. Furthermore, the sensor may likewise be mounted inside the rotor blade. The sensor may in particular be provided in a separated chamber. This enables protection against loose adhesive residues and other contaminations. However, a signal cable such as a light conductor, for example, may also be guided along the rear edge, with a piercing into the interior of the rotor blade being made preferentially in an area of the rotor blade that can be walked in. This position of the piercing enables simplified maintenance measures. In a repair case of an acceleration sensor, for example, the signal line or the light conductor may be detached at a plug which may be provided near the piercing. A signal line provided as a replacement, for example a spare light conductor, or an acceleration sensor provided as a replacement, can be laid outside in such a case. The original signal line or the original sensor may be abandoned on this occasion.

Figure 11:
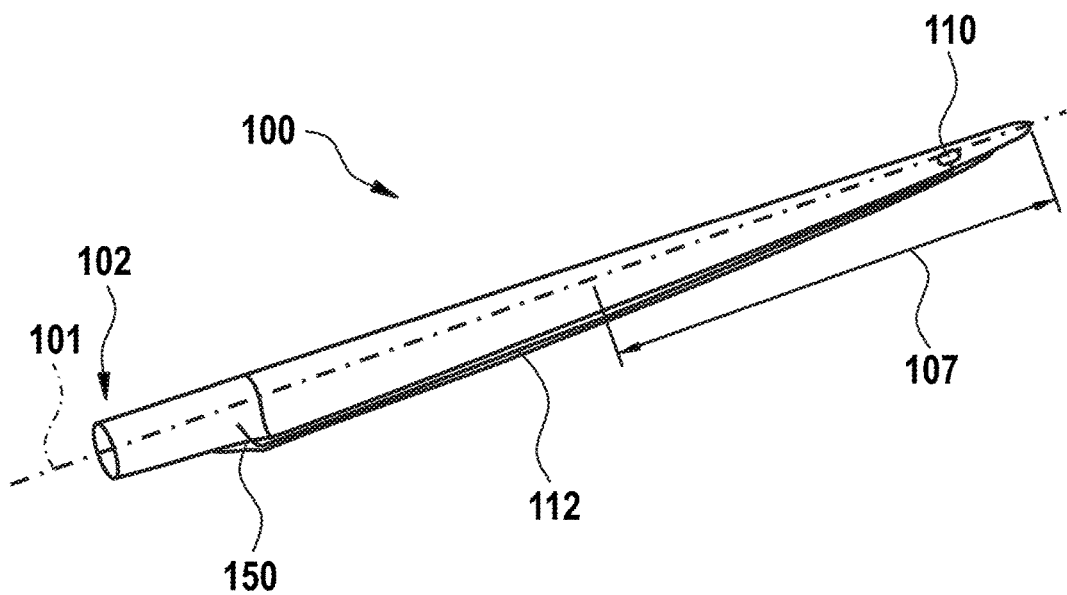
FIG. 11 schematically shows a rotor blade of a wind turbine comprising an acceleration sensor according to embodiments described herein or to be used in embodiments described herein, with a profile for the rotor blade according to embodiments described herein being provided.

According to further embodiments which may be combined with other embodiments, the light conductor 112 is likewise laid outside when a sensor is retrofitted for ice detection, for example. For retrofitting a sensor and/or for subsequently attaching a light conductor, a separate profile may be provided according to embodiments described herein. FIG. 11 shows a further rotor blade 100. In this case, a profile 150 is provided at the rotor blade's rear edge so that the light conductor 112 may be guided in the profile. According to embodiments described herein which may be combined with other embodiments, the profile has a fixing device for the light conductor 112 or a corresponding signal cable, in particular an optical signal cable.

The profile 150 may be a pultruded profile, for example. Furthermore, the profile may be adapted to the rear edge of a rotor blade. For example, it has a longitudinal extension corresponding to at least 10% or at least 30% of the rotor blade radius. Furthermore, the profile may be provided by segmented elements. Several segmented elements may extend along at least 30% of the rotor blade radius, for example. According to some embodiments which may be combined with other embodiments, the profile may have a constant geometry along its length. It may likewise have a geometry formed for different rear edge thicknesses. Furthermore, the profile may be optionally configured such as to effect aerodynamic improvements in the rotor blade.

As shown in FIG. 11A, the profile 150 may be provided at the rear edge 109 of the rotor blade. The profile may be attached to the rear edge by means of a fastening element 151, for example. The profile may be provided at the rear edge by means of an adhesive 152. According to some embodiments, the light conductor 112 may be provided, for example embedded, in the adhesive. The light conductor 112 extends within the profile 150 along the rear edge 109 of the rotor blade.

According to further embodiments, the profile may have an empty duct 153 for providing a replacement light conductor in the course of maintenance or repair. According to still further alternative or additional configurations, the profile 150 may include a structure 157 for aerodynamic flow control. This may be a Gurney flap, for example. The structure 157 is shown in FIG. 11A in dashed lines.

Figure 12:
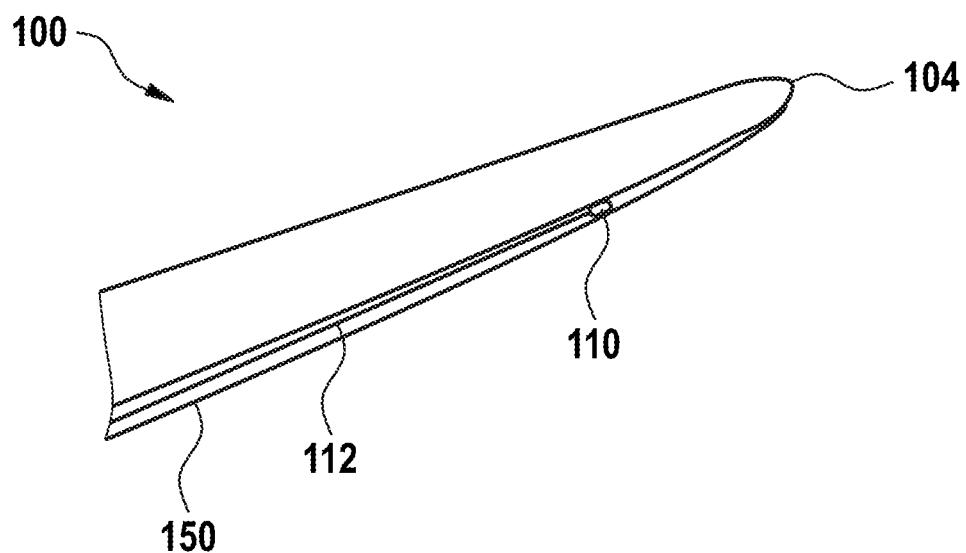
FIGS. 12, 13A and 13B schematically show a part of a rotor blade of a wind turbine comprising an acceleration sensor according to embodiments described herein or to be used in embodiments described herein.

FIG. 12 shows a further optional configuration which may be combined with other embodiments. Here, the profile 150 that may be provided at the rear edge of the rotor blade 100 has a further fastening device for an acceleration sensor 110. The acceleration sensor 110 may be provided within the profile 150. This allows a particularly simple retrofitting of an acceleration sensor and the corresponding optical signal transmission in the retrofittable profile at the rotor blade rear edge.

According to an aspect described herein, a profile for the rear edge of a rotor blade of a wind turbine is provided. The profile includes at least one fastening device for a light conductor. Typically, the profile is configured to extend along at least 30% of the rotor blade radius. According to further embodiments which may be combined with other embodiments, the at least one fastening device may be one or more adhesive joints. A light conductor may be glued in the profile, for example. According to further embodiments, a clamping device for a light conductor or an empty duct through which a light conductor may be passed may be provided as a fastening device.

According to still further embodiments which may be combined with other embodiments described herein, the profile may include a further fastening device for an acceleration sensor. The further fastening device may be provided as a clamping device, threads or a screw and/or by one or more adhesive joints. In particular, damping devices, threads or screws preferably are formed from a non-metallic material. A profile according to embodiments described herein allows a rotor blade to be retrofitted with an acceleration sensor, and a corresponding optical signal transmission to be provided in a particularly simple manner. Furthermore, the risk of lightning damage or lightning stroke may be reduced using non-metallic materials.

Figure 13A:
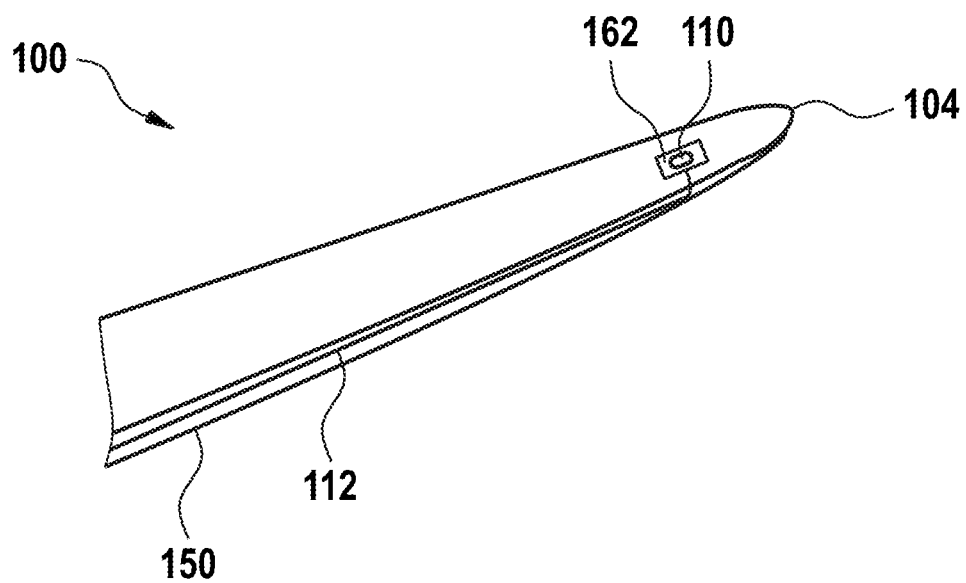
Figure 13B:
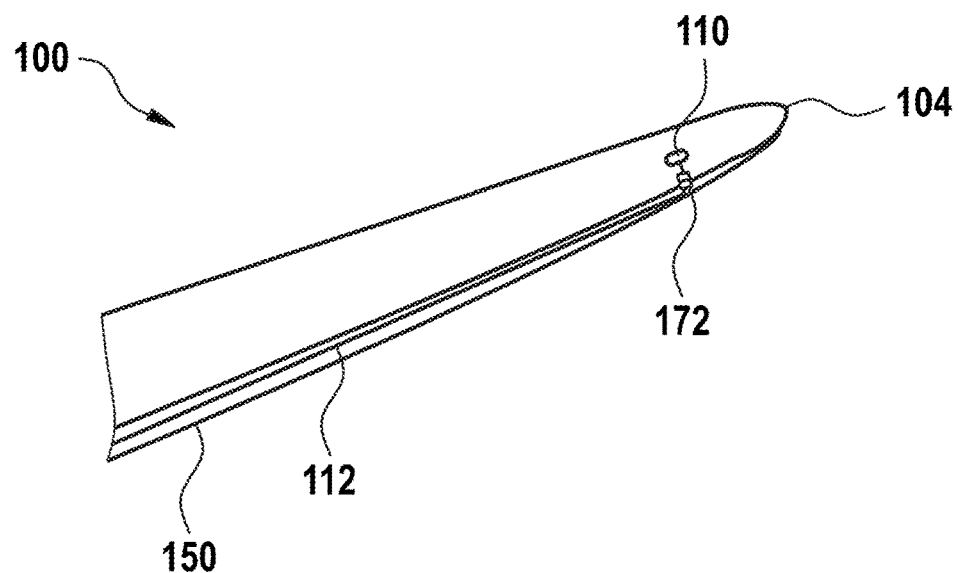

FIG. 13A shows a further embodiment which may be combined with other embodiments described herein. The acceleration sensor 110 is provided in a chamber 162. The light conductor 112 is guided out of the rotor blade 100 at the rear edge. The lightning conductor 112 is guided in the profile 150 along the rear edge toward the blade root or blade flange. As a further additional option, as shown in FIG. 13B, a plug connection 172 may be provided in an area of the transition between the rotor blade 100 and the profile 150. This allows the light conductor 112 to be easily exchanged if it should be exchanged in course of maintenance works.

It should be noted with respect to the retrofitting, maintenance or exchange of components that fiber-optic acceleration sensors, in particular fiber-optic acceleration sensors have relatively low maintenance requirements or are relatively robust. However, it should be taken into consideration for the use on wind turbines that the operational conditions are extreme due to large temperature fluctuations and/or high accelerations acting upon the components, in particular also possibly existing vibrations. Consequently, a redundancy of components or the simplified feasibility of exchanging components is particularly advantageous for the use in wind turbines.

Figure 14:
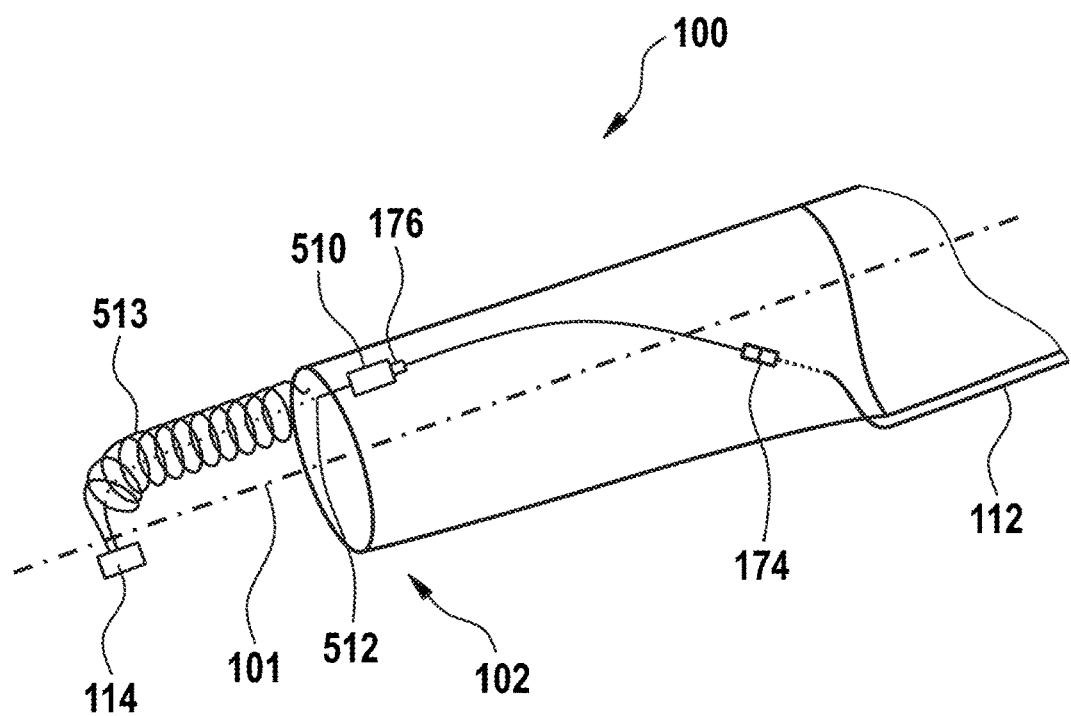
FIG. 14 schematically shows a further part of a rotor blade of a wind turbine comprising a connection of an acceleration sensor according to embodiments described herein or to be used in embodiments described herein.

FIG. 14 illustrates the cable laying, for instance the laying of the light conductor 112 in a radial area of the rotor blade facing the blade root. The details, configurations and embodiments of the cable laying may be combined with other embodiments. The light conductor 112 is guided along the rear edge of the rotor blade 100. As described above, this may be enabled in a profile, for example. A piercing into the interior of the rotor blade is provided. The radial position of the piercing may in particular be defined such that the rotor blade can be walked in at the radial position of the piercing. According to further optional configurations, a further plug connection 174 may be provided in the area of the piercing, for example immediately at the piercing or near the piercing inside the rotor blade. A light conductor or an optical fiber leads from the plug connection 174 to a plug 176 on a distributor 510, e.g. a field distributor. A further light conductor 512 leads from the distributor 510 to the evaluating unit 114. The evaluating unit 114 may be provided in the rotor hub, for example. According to typical embodiments such as ones that may be combined with other embodiments, the light conductor 512 may be guided along a spiral (spring) or through a spiral 513 such that a rotation of the rotor blade 100 about its longitudinal axis during pitching, for example, will not result in the light conductor 512 being damaged. For better clarity, the light conductor 512 is indicated in FIG. 14 by the spring or spiral in dashed lines. Improved relief of the light conductor may be given in that, according to embodiments which may be combined with other embodiments, the light conductor is guided in parallel to the spiral 513 (symbolized by the dashed line and not explicitly illustrated).

Figure 15:
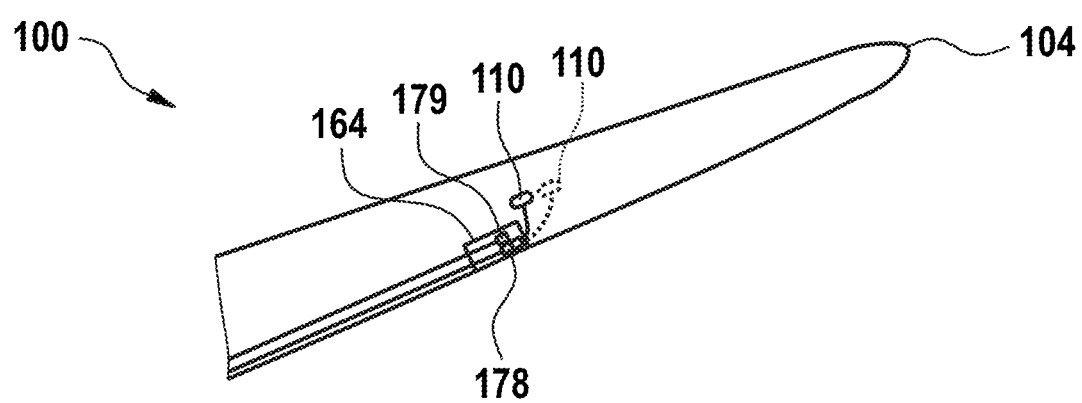
FIG. 15 schematically shows a part of a rotor blade of a wind turbine comprising an acceleration sensor according to embodiments described herein or to be used in embodiments described herein.

FIG. 15 shows a further configuration for the use of an acceleration sensor 110 in a rotor blade 100 by way of example. The acceleration sensor 110 is provided in an area near the blade tip 104. Furthermore, two light conductors are guides inside the rotor blade 100 toward the blade root or toward the blade flange. In a further chamber 164 that can be opened in the course of maintenance works, a first plug connection 178 and a further plug 179 are present. Using two light conductors allows redundancy to be provided. When one light conductor fails, the chamber 164 can be opened and the acceleration sensor's 110 plug connection 178 detached so as to subsequently plug the acceleration sensor 110 in the plug 179. As illustrated by the second acceleration sensor 110 (represented in dashed lines) provided as an alternative or in addition, additional or alternative redundancy may also be provided with respect to the acceleration sensor. In addition, or as an alternative, the failure of an acceleration sensor may be remedied by re-plugging.

According to still further embodiments which may be combined with other embodiments, a light conductor laid inside may be abandoned for repairing a light conductor, and may be replaced by a light conductor provided in a profile. It is furthermore possible for a light conductor provided in a profile to be abandoned in the course of repair, and a further light conductor with a further profile to be mounted to the first profile. According to still further embodiments, an empty duct may be provided both inside a rotor blade and/or inside a profile. A light conductor may be introduced subsequently into an empty duct. This may be combined in an advantageous manner with a plug connection 174 as shown in FIG. 14.

The use of an empty duct in a profile or in the interior of a rotor blade may be further advantageous with embodiments of acceleration sensors having a small maximum dimension in a cross-section perpendicular to the light conductor axis as described above. For fiber-optic acceleration sensors having small dimensions in the cross-section perpendicular to the light conductor axis, a replacement light conductor may be introduced into the empty duct also with a replacement acceleration sensor, if need be.

According to embodiments described herein, a plurality of possible uses of acceleration sensors, in particular fiber-optic acceleration sensors such as fiber-optic acceleration sensors in wind turbines is described, wherein configurations are provided by the radial positioning, the structure of fiber-optic acceleration sensors, as well as the mounting of acceleration sensors and/or the mounting of light conductors.

Figures 16, 17:
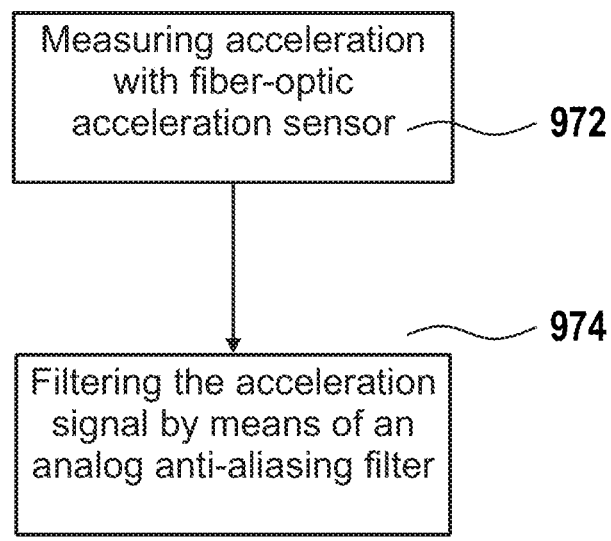
FIGS. 16 to 18 show flow charts of methods for monitoring and/or controlling and/or regulating wind turbines according to embodiments described herein.

According to a further embodiment, a method for monitoring a wind turbine is provided. A corresponding flow chart is represented in FIG. 16. Acceleration is measured by means of a fiber-optic acceleration sensor (see reference numeral 972), wherein the acceleration sensor is provided at a radial position in the range of the outer 70% of the radius of a rotor blade of the wind turbine. Further, the acceleration signal of the fiber-optic acceleration sensor is filtered by means of an analog anti-aliasing filter (see reference numeral 974).

According to a further embodiment, a method for monitoring a wind turbine is provided. A corresponding flow chart is represented in FIG. 17. Acceleration is measured by means of a fiber-optic acceleration sensor (see reference numeral 982), wherein the acceleration sensor is provided at a radial position in the range of the outer 70% of the rotor blade radius, with the acceleration sensor being made of less than 10% by weight from metal or containing less than 20 g of metal.

Figure 18:
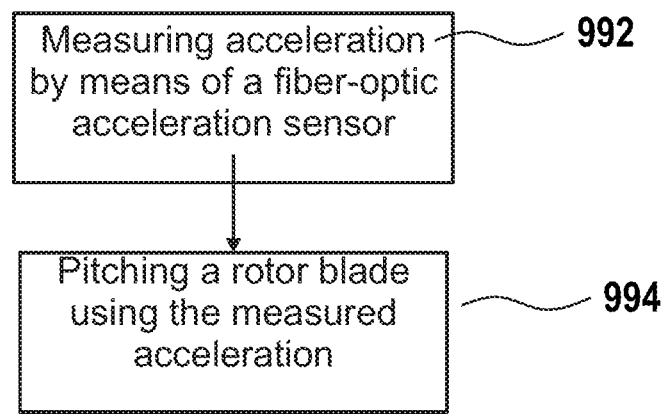

According to a still further embodiment, a method for the individual pitch control of rotor blades of a wind turbine is provided. A corresponding flow chart is represented in FIG. 18. The method includes measuring (see reference numeral 992) acceleration by means of an acceleration sensor, wherein the acceleration sensor is provided in a first rotor blade, for example at a position in the range of the outer 70% of the radius. The method further includes pitching (see reference numeral 994) the first rotor blade of the wind turbine using the measured acceleration, wherein the pitching is performed in the course of an individual pitch control. The method further includes high-pass filtering a signal of the acceleration sensor for determining a time-variable parameter, wherein the pitching of the first rotor blade of the wind turbine is performed using the time-variable parameter.

According to the embodiments described herein, a time-variable, high-pass filtered parameter is determined from the acceleration signal and immediately used for the individual pitch control. Complicated evaluating processes or complicated measuring methods of a plurality of different parameters can hereby be omitted. Only time-variable, high-pass filtered parameters are used for a controller. These can be determined directly from the acceleration signals in a particularly simple manner according to embodiments described herein. These time-variable parameters have the advantage to be more stable even with the use of fiber-optic acceleration sensors that may be subjected to drift, do not require calibration, and the sensors for the measurement are technically simple, respectively. In this case, complicated integration steps inter alfa, etc., may be dispensed with. According to some embodiments which may be combined with other embodiments described herein, the high-pass filtering may be performed by forming a time derivative, by high-pass filtering and/or by means of Fourier transformation. It should be noted here that a time derivative, in particular when suitable coefficients are selected, will correspond to a high-pass filtering or a suppression of changes at low frequencies relative to signal changes at high frequencies. In terms of signaling, a high-pass may therefore be considered as a differentiator, and a temporal differentiation may be considered as a high-pass, respectively. The high-pass filtering may thus have a cutoff frequency for signal portions having frequencies higher than the rotor's frequency of rotation. The cutoff frequency may be from 0.3 to 0.5 Hz, wherein the high-pass filtering in particular has a suppression of a signal of 0.2 Hz relative to a signal of 0.6 of at least a factor 5.

In particular in combination with a fiber-optic acceleration sensor, the method may furthermore include opto-electronically converting the fiber-optic acceleration sensor's signal and filtering the opto-electronically converted acceleration signal by means of an analog anti-aliasing filter. A signal is thus used for the individual pitch control which is high-pass filtered, on the one hand, and moreover has been subjected to analog anti-aliasing filtering, on the other. Hence, further time-variable parameters are not needed for an individual pitch control, albeit can be optionally added to a control parameter. According to typical embodiments which may be combined with other embodiments described herein, the filtering of the opto-electronically converted acceleration signal by means of the analog anti-aliasing filter may have a cutoff frequency from 10 Hz to 40 Hz, in particular from 15 Hz to 25 Hz.

Methods for the individual pitch control are known based on a plurality of different control or measured variables. The use of acceleration sensors in a rotor blade, wherein the acceleration sensor is provided at a radial position in the range of the outer 70% of the radius, allows a perfectly suitable signal to be used for an individual pitch control using an acceleration sensor. When the signal of an acceleration sensor provided in a radially outer area of the rotor blade is used, an improved pitch control may be achieved in this radial area due to the acceleration sensors' sensitivity. Here, by measuring acceleration in each case in one rotor blade, an individual pitch control may be performed for each rotor blade.

According to embodiments described herein, individual pitch control means a control in which each rotor blade has a drive unit of its own for pitch control. FIG. 5, for example, shows a respective drive unit 570 connected to a control unit 50 of the wind turbine so that in each case one drive unit 570 can rotate the rotor blade about an axis 501 to vary the rotor blade pitch angle, i.e. the pitch of the rotor blade. In the individual pitch control, each drive unit 570 may receive a signal of its own for the pitch control which is not necessarily required to be identical to the signals of the other drive units for the other rotor blades. It is obvious that even in an individual pitch control all of the rotor blades may be driven by an identical pitch signal. However, an individual pitch control is characterized by enabling deviations between rotor blades in the pitch control.

An individual pitch control may in particular be provided in embodiments where an acceleration sensor is located in the outer 50% of the rotor blade radius, furthermore in particular in a range of 60% to 90% of the rotor blade radius. As represented in FIG. 5, an acceleration sensor 110 is provided in a rotor blade 101. The acceleration sensor may be a fiber-optic acceleration sensor, for example. The optical signal is guided to an evaluating unit 114 via a light conductor 112. The optical signal may be guided to the evaluating unit 114 via a distributor 510, for example. The evaluating unit 114 is connected to the wind turbine's control unit 50. An individual control of the drive unit 570 for each of the rotor blades 100 may be provided based on the acceleration sensors' 110 signals. A time-variable parameter is used which is directly determined from the acceleration signal. Determining the time-variable parameter directly from the acceleration signal is deemed to denote that integration steps, etc. have been dispensed with or integration steps, etc. have been reduced.

According to further embodiments, several acceleration sensors may in particular be used on a rotor blade at several radial positions.

With respect to the individual pitch control by means of acceleration sensors, a wind turbine is provided according to an embodiment. The wind turbine comprises a first rotor blade mounted to a hub, a first drive unit for rotating the first rotor blade for a pitch control of the first rotor blade, at least one second rotor blade mounted to the hub, at least one second drive unit for rotating the second rotor blade for a pitch control of the second rotor blade, wherein the second drive unit is controllable independent of the first drive unit, and a control unit for controlling at least the first drive unit. The wind turbine further comprises an acceleration sensor, wherein the acceleration sensor is provided at a radial position in the range of the outer 70% of the radius of the first rotor blade, and a measurement signal line for guiding the acceleration sensor's measurement signal to the control unit and/or regulating unit, wherein the control unit and/or regulating unit are configured to control a pitching of the first rotor blade by means of a determined time-variable parameter.

In such embodiments of wind turbines, the acceleration sensor may be provided in particular in the outer 50% of the rotor blade radius, furthermore in particular in a range of 60% to 90% of the rotor blade radius. Here, it is in particular advantageous for the acceleration sensor to be made of less than 10% by weight from metal or to contain less than 20 g of metal. Such an acceleration sensor may in particular be a fiber-optic acceleration sensor according to any one of the embodiments as described with respect to FIGS. 9A and 9B. Furthermore, the acceleration sensor or a light conductor for signal transmission of the acceleration sensor's signal according to any one of the embodiments as described with respect to FIGS. 10 to 15 may be provided.

While the present invention has been described above using typical exemplary embodiments, it is not restricted thereto but can be modified in a number of ways. Neither is the invention restricted to the mentioned possible applications.

The invention claimed is:

1. A method for the individual pitch control of rotor blades of a wind turbine, comprising:
    measuring acceleration by means of a fiber-optic acceleration sensor in a rotor blade of the wind turbine;
    opto-electronically converting a signal of the fiber-optic acceleration sensor;
    filtering the opto-electronically converted acceleration signal by means of an analog anti-aliasing filter;
    high-pass filtering the signal of the fiber-optic acceleration sensor to determine a time-variable parameter, and
    setting the pitch of the rotor blade of the wind turbine using the time-variable parameter, said pitch setting being performed in the course of an individual pitch control.

2. The method according to claim 1, wherein the fiber-optic acceleration sensor is provided at a radial position in the range of the outer 70% of the radius of a first rotor blade.

3. The method according to claim 1, wherein the high-pass filtering is performed by forming a time derivative, by high-pass filtering and/or by means of Fourier transformation.

4. The method according to claim 1, wherein the high-pass filtering has a cutoff frequency from 0.3 to 0.5 Hz.

5. The method according to claim 1, wherein the filtering of the opto-electronically converted acceleration signal by means of the analog anti-aliasing filter has a cutoff frequency from 10 Hz to 40 Hz.

6. The method according to claim 1, wherein the signal of the fiber-optic acceleration sensor is guided to the hub by means of a light conductor.

7. The method according to claim 6, wherein the light conductor is provided at the rear edge of the rotor blade.

8. The method according to claim 6, wherein the light conductor is provided on a profile provided at the rear edge of the rotor blade.

9. The method according to claim 8, wherein the profile is a pultruded profile and/or wherein the profile causes the rotor blade to be aerodynamically influenced.

10. The method according to claim 8, wherein the profile extends along at least 10% or at least 30% of the rotor blade radius.

11. The method according to claim 8, wherein the acceleration sensor is provided within the profile.

12. The method according to claim 7, wherein the light conductor is guided into the rotor blade interior from outside at a radial position where the rotor blade can be walked in.

13. A wind turbine, comprising:
a first rotor blade mounted to a hub;
a first drive unit for rotating the first rotor blade for a pitch control of the first rotor blade;
at least one second rotor blade mounted to the hub;
at least one second drive unit for rotating the second rotor blade for a pitch control of the second rotor blade, wherein the second drive unit is controllable independent of the first drive unit;
a control unit for controlling at least the first drive unit;
a fiber-optic acceleration sensor in the wind turbine's first rotor blade;
an opto-electronic converter for converting a signal of the fiber-optic acceleration sensor; and
an analog anti-aliasing filter configured to filter the opto-electronically converted acceleration signal,
wherein the control unit is configured to control pitching of the first rotor blade using a time-variable parameter, and
wherein the time-variable parameter is determined by high-pass filtering the signal of the fiber-optic acceleration-sensor.

14. The wind turbine according to claim 13, wherein the fiber-optic acceleration sensor is provided at a radial position in the range of the outer 70% of the radius of the first rotor blade.

15. The wind turbine according to claim 13, wherein the acceleration sensor is made of less than 10% by weight from metal or contains less than 20 g of metal.

16. The wind turbine according to claim 13, furthermore comprising:
a light conductor which is guided from the fiber-optic acceleration sensor to a radial rotor blade position where the rotor blade can be walked in.

17. The wind turbine according to claim 16, wherein the fiber-optic acceleration sensor has a maximum expansion of 10 mm in a cross-section perpendicular to an axis of the light conductor.

18. The wind turbine according to claim 16, wherein the light conductor is provided at the rear edge of the rotor blade.

19. The wind turbine according to claim 16, wherein the light conductor is provided on a profile provided at the rear edge of the rotor blade.

20. The wind turbine according to claim 19, wherein the profile is at least one of a pultruded profile and configured to cause the rotor blade to be aerodynamically influenced.

21. The wind turbine according to claim 19, wherein the fiber-optic acceleration sensor is provided within the profile.

* * * * *